United States Patent
Rogers et al.

(10) Patent No.: US 10,473,458 B2
(45) Date of Patent: Nov. 12, 2019

(54) SELF-CALIBRATING WHEEL ALIGNER WITH IMPROVED PORTABILITY

(71) Applicant: SNAP-ON, Incorporated, Kenosha, WI (US)

(72) Inventors: Steven W. Rogers, Conway, AR (US); David A. Jackson, Point Roberts, WA (US); Adam C. Brown, Maumelle, AR (US); Ronald D. Swayne, Sherwood, AR (US); Brian K. Gray, Conway, AR (US); Bryan C. Minor, Conway, AR (US); Rodney Harrell, Greenbrier, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 421 days.

(21) Appl. No.: 15/287,499

(22) Filed: Oct. 6, 2016

(65) Prior Publication Data

US 2017/0097230 A1 Apr. 6, 2017

Related U.S. Application Data

(60) Provisional application No. 62/238,017, filed on Oct. 6, 2015.

(51) Int. Cl.
*G01B 11/275* (2006.01)
*B60R 11/04* (2006.01)
(Continued)

(52) U.S. Cl.
CPC ............ *G01B 11/275* (2013.01); *B60R 11/04* (2013.01); *B60S 5/00* (2013.01); *G01B 11/2755* (2013.01);
(Continued)

(58) Field of Classification Search
CPC ... B60R 11/04; G01B 11/275; G01B 11/2755; G01B 2210/12; G01B 2210/14; G01M 17/013

See application file for complete search history.

(56) References Cited

U.S. PATENT DOCUMENTS 5,535,522 A 7/1996 Jackson
5,832,617 A 11/1998 Gill
(Continued)

FOREIGN PATENT DOCUMENTS

WO 0214784 A1 2/2002
WO 2013/163643 A1 10/2013

OTHER PUBLICATIONS

International Preliminary Examination Report on Patentability dated Apr. 19, 2018 for related International Application No. PCT/US2016/055810.

(Continued)

*Primary Examiner* — Obafemi O Sosanya
(74) *Attorney, Agent, or Firm* — Miles & Stockbridge, P.C.

(57) ABSTRACT

A portable vehicle alignment system has a vertical central column with a carriage movable along its length, and a pair of camera arms pivotably attached to the carriage, each with a camera pod. The camera pods each have a camera for capturing image data of a respective vehicle-mounted target. One pod also has a calibration target disposed in a known relationship to its camera, and the other pod has a calibration camera disposed in a known relationship to its camera for capturing images of the calibration target. The camera arms pivot between an extended position where the cameras are disposed to capture image data of the vehicle targets and the calibration camera is disposed to capture images of the (Continued)

calibration target, and a folded position where the aligner has a width smaller than the width between the camera pods.

17 Claims, 25 Drawing Sheets

(51) Int. Cl.

| | |
|---|---|
| *G06K 9/00* | (2006.01) |
| *H04N 5/247* | (2006.01) |
| *B60S 5/00* | (2006.01) |
| *G06T 7/00* | (2017.01) |
| *H04N 7/18* | (2006.01) |
| *G06T 7/60* | (2017.01) |
| *G06T 7/73* | (2017.01) |
| *G08B 5/22* | (2006.01) |
| *B62D 17/00* | (2006.01) |
| *G01M 17/013* | (2006.01) |

(52) U.S. Cl.
CPC ........ *G06K 9/00624* (2013.01); *G06T 7/0004* (2013.01); *G06T 7/60* (2013.01); *G06T 7/73* (2017.01); *H04N 5/247* (2013.01); *H04N 7/181* (2013.01); *B62D 17/00* (2013.01); *G01B 2210/12* (2013.01); *G01B 2210/14* (2013.01); *G01B 2210/26* (2013.01); *G01B 2210/30* (2013.01); *G01M 17/013* (2013.01); *G06T 2207/10016* (2013.01); *G06T 2207/30164* (2013.01); *G08B 5/22* (2013.01)

(56) References Cited

U.S. PATENT DOCUMENTS

| | | | |
|---|---|---|---|
| 5,875,418 A | 2/1999 | Gill | |
| 5,909,379 A | 6/1999 | Dale | |
| 5,969,246 A | 10/1999 | Jackson | |
| 6,148,528 A | 11/2000 | Jackson | |
| 6,237,234 B1 | 5/2001 | Jackson | |
| 6,285,932 B1 | 9/2001 | Bellefeuille | |
| 6,323,776 B1 | 11/2001 | Jackson | |
| 6,327,548 B1 | 12/2001 | Healy | |
| 6,363,619 B1 | 4/2002 | Schirmer et al. | |
| 6,405,111 B2 | 6/2002 | Rogers | |
| 6,512,968 B1 | 1/2003 | Bellefeuille | |
| 6,564,128 B2 | 5/2003 | Rogers | |
| 6,658,751 B2 | 12/2003 | Jackson | |
| 6,731,382 B2 * | 5/2004 | Jackson | G01B 11/2755 33/203.19 |
| 6,859,699 B2 | 2/2005 | Carroll | |
| 6,871,408 B2 | 3/2005 | Malard | |
| 6,931,340 B2 | 8/2005 | Jackson | |
| 6,959,253 B2 | 10/2005 | Jackson | |
| 6,968,282 B1 | 11/2005 | Jackson | |
| 7,040,029 B1 | 5/2006 | Hillman et al. | |
| 7,069,660 B2 | 7/2006 | Robb | |
| 7,182,301 B1 * | 2/2007 | Oddsen, Jr. | F16M 11/10 248/122.1 |
| 7,313,869 B1 | 1/2008 | Rogers | |
| 7,458,165 B2 | 12/2008 | Rogers | |
| 7,643,915 B2 | 1/2010 | Jackson | |
| 7,681,322 B1 | 3/2010 | Pruitt | |
| 7,703,213 B2 | 4/2010 | Rogers | |
| 7,855,783 B2 | 12/2010 | Kling | |
| 7,917,259 B2 | 3/2011 | Rogers | |
| 7,937,844 B2 | 5/2011 | Rogers | |
| 8,073,586 B2 | 12/2011 | Rogers | |
| 8,452,484 B2 | 5/2013 | Rogers | |
| 8,539,684 B2 | 9/2013 | Rogers | |
| 8,573,363 B2 | 11/2013 | Healy | |
| 8,904,654 B2 | 12/2014 | Rogers | |
| 9,134,215 B1 | 9/2015 | Gray | |
| 10,072,926 B2 | 9/2018 | Rogers et al. | |
| 10,121,255 B2 | 11/2018 | Leong et al. | |
| 2005/0027473 A1 | 2/2005 | Davidson et al. | |
| 2005/0041847 A1 | 2/2005 | Dorrance et al. | |
| 2006/0274303 A1 | 12/2006 | Jackson et al. | |
| 2009/0031782 A1 | 2/2009 | Jackson | |
| 2009/0073425 A1 * | 3/2009 | Kling, III | G01B 11/2755 356/139.09 |
| 2010/0277047 A1 * | 11/2010 | Sung | A47B 77/18 312/333 |
| 2012/0069173 A1 | 3/2012 | Takahashi et al. | |
| 2014/0092495 A1 | 4/2014 | Bowers | |
| 2014/0205140 A1 | 7/2014 | Lovberg | |
| 2015/0010228 A1 | 1/2015 | Rogers | |
| 2015/0049188 A1 * | 2/2015 | Harrell | G01B 11/2755 348/139 |
| 2015/0049199 A1 | 2/2015 | Rogers | |
| 2015/0070491 A1 | 3/2015 | Rogers | |
| 2016/0195388 A1 | 7/2016 | D'Agostino et al. | |
| 2016/0273914 A1 | 9/2016 | Strege et al. | |
| 2017/0097229 A1 | 4/2017 | Rogers et al. | |
| 2017/0205246 A1 | 7/2017 | Koenig et al. | |

OTHER PUBLICATIONS

Non-Final Office Action dated Jan. 25, 2018 for related U.S. Appl. No. 15/287,528.

International Search Report dated Jan. 6, 2017 for International Application No. PCT/US16/055814.

International Search Report dated Jan. 6, 2017 for International Application No. PCT/US16/055810.

International Search Report filed Aug. 31, 2007 for International Application No. PCT/US07/019171.

Extended European search report dated Feb. 20, 2019 for EP 16 85 4345.

Extended European Search Report dated Apr. 10, 2019 for EP Application No. 16 85 4347.

* cited by examiner

SELF-CALIBRATING WHEEL ALIGNER WITH IMPROVED PORTABILITY

RELATED APPLICATIONS

The present application claims priority to U.S. Provisional Application No. 62/238,017, entitled "Portable Vehicle Aligner With High Speed Camera Based Processing and Advanced Analytics," filed Oct. 6, 2015, which is incorporated herein by reference in its entirety.

BACKGROUND OF THE INVENTION

Field

This invention relates to an automotive wheel aligner of the machine vision type.

Background

Conventional camera-based 3D machine vision-type aligners are not very portable. Camera based wheel aligners have a pair of cameras mounted such that each camera can look down a side of the vehicle at targets attached to the wheels. The cameras are usually mounted about 100" apart and are about 100" in front of the vehicle. Also, the vehicle needs to be raised so the alignment technician can work underneath it. Thus, the aligner cameras either have to move up and down with the rack, or be mounted high enough to be able to see the targets when the rack is raised. The cameras can be over 100" off the ground when raised. Conventional aligners also include a console that may house a monitor, printer, computer, and target and clamp storage. Many camera based aligners' cameras are bolted to the ground and cannot be moved from one alignment bay to the next. However, it is useful to be able to move the aligner to another bay, because the vehicle under test might require parts, and removing it from the rack is not feasible. In such a case, the aligner is no longer useable. It is therefore highly desirable to be able to move it to a new location.

There are some camera based aligners that are movable; however, these have some significant limitations. In one of these aligners, the camera beam is simply bolted to the side or back of the console. This makes for a very large assembly that needs to be rolled together through the shop. This assembly is over a 100" wide, 36" deep and at least 80" high. There is no easy way to maneuver this aligner in what typically is a crowded shop environment. Another portable camera based aligner has separate poles for the cameras and the console, so the technician has to move three discrete components to the new location. Also, the cameras are mounted on poles that are over 100" tall, and they are difficult to move through doors or other areas with a low ceiling. There are also other types of camera aligners that mount to the rack. These are smaller since there is no pole; however, there are special mounting requirements for each rack. It is clear that a better solution to the portable camera based aligner is desirable.

Machine vision vehicle alignment systems using movable cameras and targets attached to vehicle wheels, also known as "image aligners," are well known. The targets are viewed by the cameras such that image data obtained for a prescribed alignment process can be used to calculate vehicle alignment angles for display through a user interface, usually a computer monitor. Early system implementations included rigid beams that connected the cameras so that their position and orientation with respect to each other could be determined and be relied upon as unchanging. Later system implementations were introduced comprising the use of cameras not rigidly connected to each other, but using a separate camera/target system to continuously calibrate the position of one vehicle mounted target viewing camera to another. This type of system is described in U.S. Pat. Nos. 5,535,522; 6,931,340; 6,959,253; and 6,968,282, all of which are hereby incorporated by reference herein in their entirety. An example of a vehicle wheel aligner using such image processing is the Visualiner 3D or "V3D", commercially available from John Bean Company, Conway, Ark., a division of Snap-on Incorporated There are many factors that influence the measurement of a vehicle that can lead to a good aligner and a good mechanic to get bad readings. An uneven roll surface during the roll back procedure can cause the wheel to move or rotate about a different axis than the one it is rolling about. Camera based aligners require measurements of alignment parameters, which include an axis of rotation, a wheel angle, a vehicle wheel plane, or a vehicle wheel center. Another influence in bad readings is if, during caster swing, the vehicle brakes are not locked and the vehicle rolls, or the skid plates and turntables are not unlocked or are sticky, then large forces can build up within the vehicle and cause a bad reading. Also, if during adjustment the skid plates or turn tables are sticky, there is a buildup of forces within the vehicle that adversely affect the alignment. Other areas of contribution to reduced accuracy is if the rack is twisted, or the vehicle is jacked up and not let down and settled correctly.

There is a need for an aligner to incorporate cameras that can take measurements fast enough and continuously to measure, detect, and correct or warn of a problem with the alignment measurement. Further, there is a need for an aligner that measures, detects or corrects all possible issues that might make the alignment readings incorrect. With such an aligner the technician can be confident that the alignment just performed is correct.

Current camera based aligners require a positioning or runout procedure to measure the wheel axis (also referred to as "wheel spindle" or "axis of rotation" throughout this document), and a steering swing procedure to measure the caster and steering axis inclination (SAI). This procedure is time consuming and frequently requires the technician to hold the vehicle steady at certain points of the positioning and caster swing.

There is a need for a faster positioning procedure and a faster caster swing procedure, where the mechanic can perform the procedure without stops or delays.

When an aligner is in need of repair, a service technician is sent to the site. Sometimes the issue could be solved if the service technician could operate the aligner remotely, avoiding a costly service call. Methods exist to take control of an aligner using special software and an internet connection, but there are limits to their capabilities.

There is a need for a remote display/interface for the technician on site using the equipment, and a remote display/interface that service personnel at a different location can use to control the aligner, all on a simple readily available device. A solution that easily does both of these in one simple architecture would be highly desirable.

BRIEF SUMMARY

Given the foregoing, the ideal camera based aligner is self-contained on a single console with a height and width to navigate through the typical shop. Shops are laid out so mechanics have the ability to maneuver easily from area to area, and thus it is desirable that the self-contained aligner fits through these areas. Accordingly, the disclosed aligner incorporates the following features in several embodiments:

Self-calibrating cameras attached to arms that fold, to reduce the width of the aligner.

Folding arms movably attached to the console to minimize the width of the console, resulting in a single self-contained aligner and console.

A locking mechanism to hold the arms closed, yet have easy unlocking for regular width alignment.

A screw shaft and mechanism to lower and lock the arms, and to lower the center of gravity and overall height of the aligner to facilitate less tipping and pass-way through low ceilings or doorways. Vertical movement with the screw shaft is reduced or eliminated.

Various methods of automatically closing the arms when they are lowered for easier storage and transportation. For example, two posts on the side of the console that push up the arms, an internal extra slide within the slide car that pulls the arms closed, another mechanical motor and mechanism to pull the arms closed.

Wheel clamps/targets mounted on the console at an angle to minimize the depth and width of the console.

Clamshell "structural" arms to reduce the weight and cost of the arms, thereby allowing for a small torque motor and lower power requirement, thus further reducing weight and costs.

Self-contained portable aligners can advantageously be moved from one location or alignment bay to the next with ease. However, they typically lack functionality once they are located at the alignment bay. When a car is being aligned it is desirable to be able to see the readings from one side or the other side of the vehicle. Self-contained portable aligners have all the equipment for measurement in a single easy to move design, but if desired it is difficult to move just the display device to the side of the vehicle so the technician can see it. Being all in one, if the technician moves the console for easy viewing of the display, he has also moved the cameras and they can no longer see the wheel targets. There is a need for a portable aligner that once in the bay could also be portable to be able to view the display device. The disclosed aligner addresses the foregoing problems by incorporating the following features in several embodiments:

A nesting console with a portable camera base.

Wireless communication between the cameras and the console.

The ideal camera based aligner also has a rapid camera measurement device to measure the discrete elements that make up certain critical alignment procedures, in order to measure, detect, correct, or warn of problems. It also has the ability to perform procedures to measure the vehicle wheel axis and the caster and steering axis inclination (SAI) continuously, without pausing or holding. Accordingly, the disclosed aligner incorporates the following features in several embodiments:

A rapid camera measurement device to measure the discrete elements that make up the positioning procedure to measure, detect, correct, or warn of issues.

A rapid camera measurement device to measure the discrete elements that make up the caster swing procedure to measure, detect, correct, or warn of issues.

A rapid camera measurement device to measure the discrete elements that make up the adjustment of the vehicle to measure, detect, correct, or warn of issues.

A rapid camera measurement device to measure the discrete elements that make up the jacking and settling of the vehicle to measure, detect, correct, or warn of issues.

Thrust Angle checking before and after procedures that would indicate the alignment rack's turntables or skid plates are sticking.

Rack twist measurement correct or warn.

Detection of suspension changes during alignment or measurement procedures to correct and/or warn.

Continual rapid rigid body analysis of measurements to detect stress build ups, and warn or correct.

Non-stop runout procedures and caster swing procedures.

The disclosed aligners also include a fully networked system aligner (web server) for complete, simple, inexpensive functionality of remote display and control of the aligner from the user's shop or from the service desk many miles away.

In an embodiment of the present disclosure, a portable vehicle alignment system comprises a base; a substantially vertical central column rigidly attached to and supported by the base, the central column having a carriage mounted to move along a length of the central column; and a pair of camera arm assemblies, each camera arm assembly having a proximal end pivotably attached to the movable carriage, and a distal end comprising a camera pod. A first one of the camera pods comprises a first camera for capturing image data of a first target mounted on a vehicle, and a calibration target disposed in a known relationship to the first camera. A second one of the camera pods comprises a second camera for capturing image data of a second target mounted on the vehicle, and a calibration camera disposed in a known relationship to the second camera for capturing images of the calibration target. The camera arm assemblies are pivotable between an extended position where the first and second cameras are respectively disposed to capture image data of the first and second targets mounted on the vehicle, the calibration camera is disposed to capture images of the calibration target, and the aligner has a first width between the two camera pods, and a folded position where the aligner has a second width smaller than the first width between the camera pods.

Further features and advantages of the present disclosure, as well as the structure and operation of various embodiments of the present disclosure, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the present invention and to enable a person skilled in the relevant art(s) to make and use the present invention.

Additionally, the left-most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which are the same in structure, operation, or form but may be identified as being in different locations in space or recurring at different points in time (e.g., reference numbers '110*a*' and '110*b*' may indicate two different energy detection devices which are functionally the same, but are located at different points in a simulation arena).

Further embodiments, features, and advantages of the present invention, as well as the operation of the various embodiments of the present invention, are described below with reference to the accompanying figures.

DETAILED DESCRIPTION OF THE INVENTION

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Self-Calibrating Aligner with Improved Portability

Figure 18:
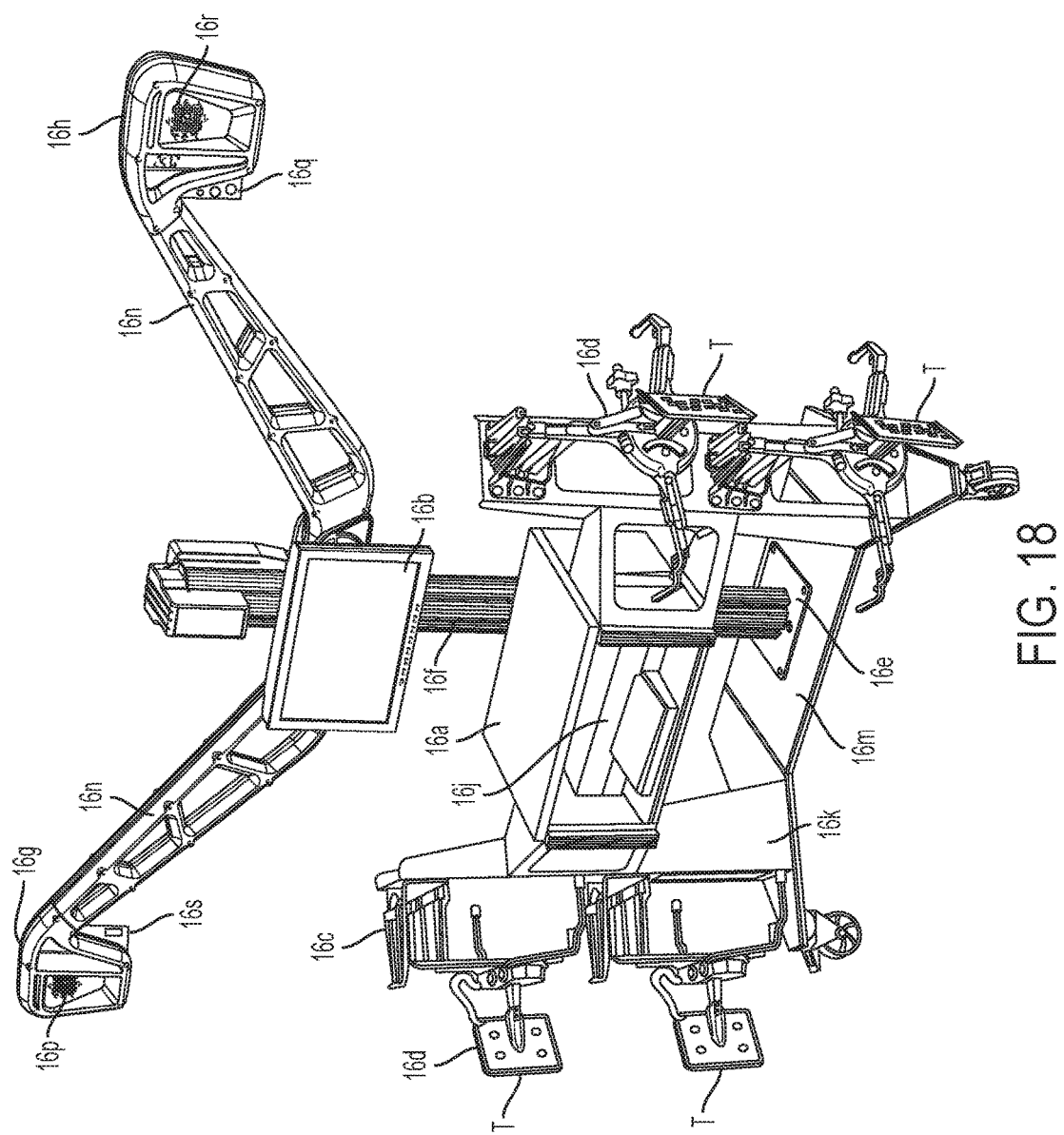
FIGS. 18-22 are perspective views of a portable self-calibrating wheel aligner according to embodiments of the present disclosure.
Figure 19:
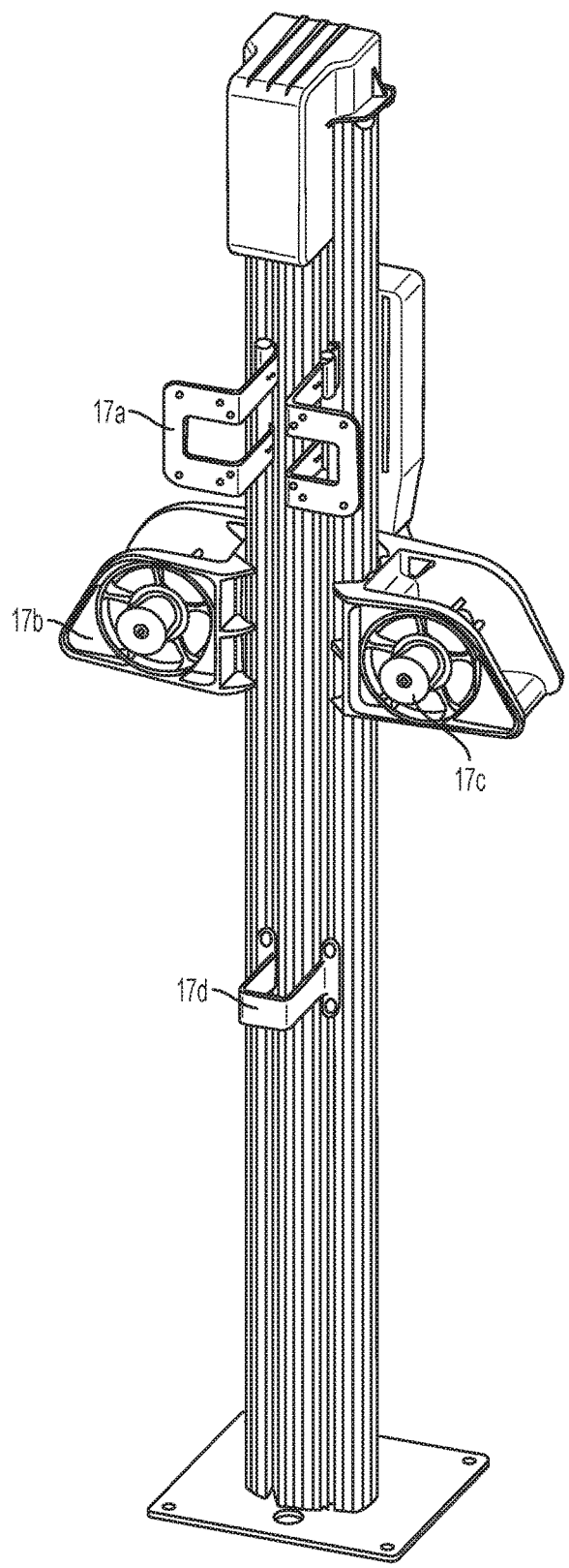
Figure 20:
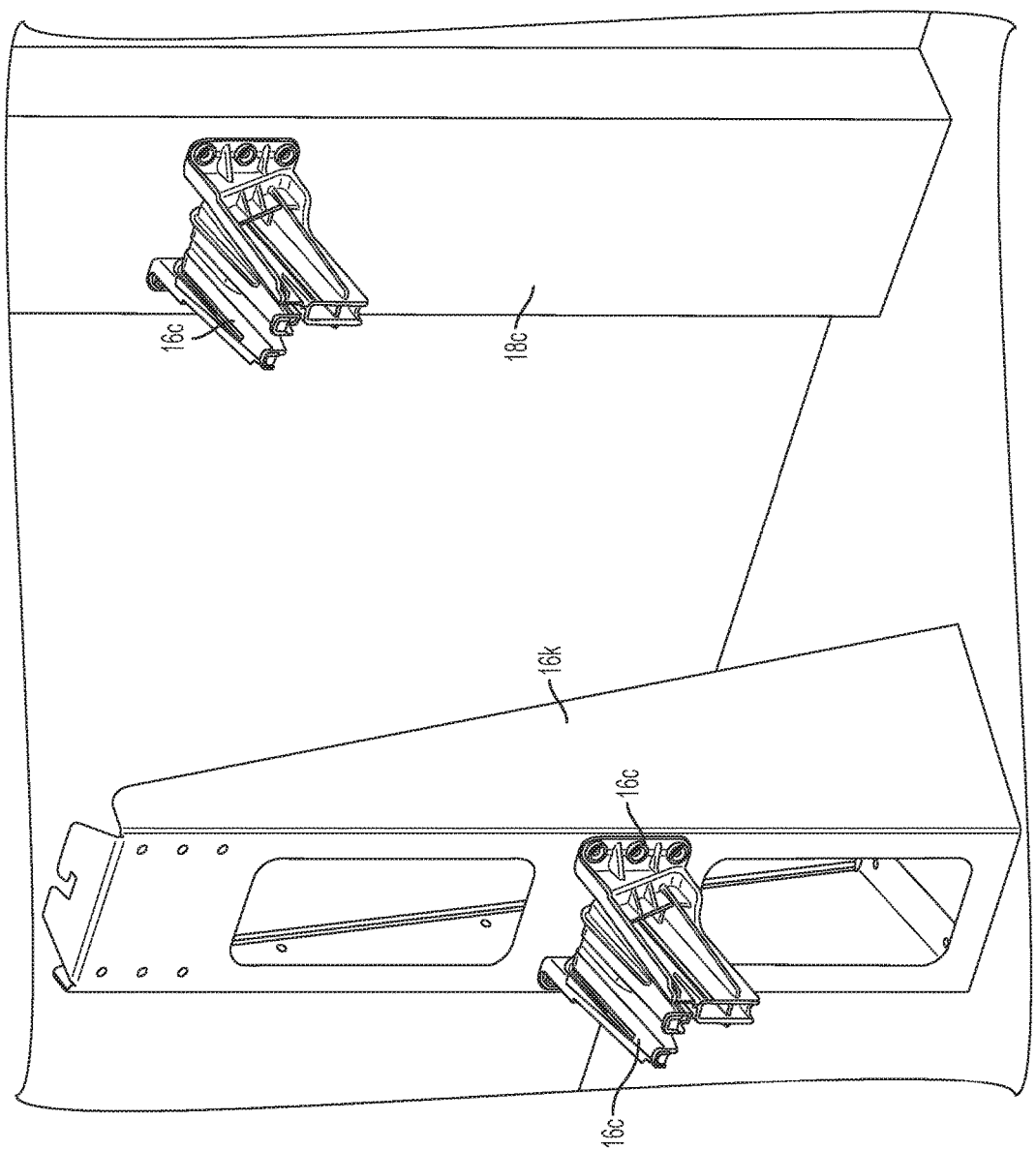

An aligner with certain discrete components that can be fully disassembled and assembled in any configuration is shown in FIGS. 18-20. Referring to FIG. 18, an embodiment of the disclosed aligner includes camera pods 16g, 16h, a base 16m, an upright column 16f attached to base 16m via base plate 16e, target and clamp storage 16c for target/clamp assemblies 16d, a printer 16j, a keyboard shelf 16a, and a display device which can include a monitor 16b. The term "camera pod" as used herein refers to a housing for at least one camera. In some embodiments, the camera pods also house other additional equipment such as a calibration target, a wireless communications module, etc. as discussed in detail herein below. The display device in certain embodiments can include a host personal computer (PC) and a monitor, a smart TV, a laptop computer, a tablet such as an Apple iPad™, a Hewlett-Packard Chromebook™, or any other device capable of running a browser.

Figure 23A:
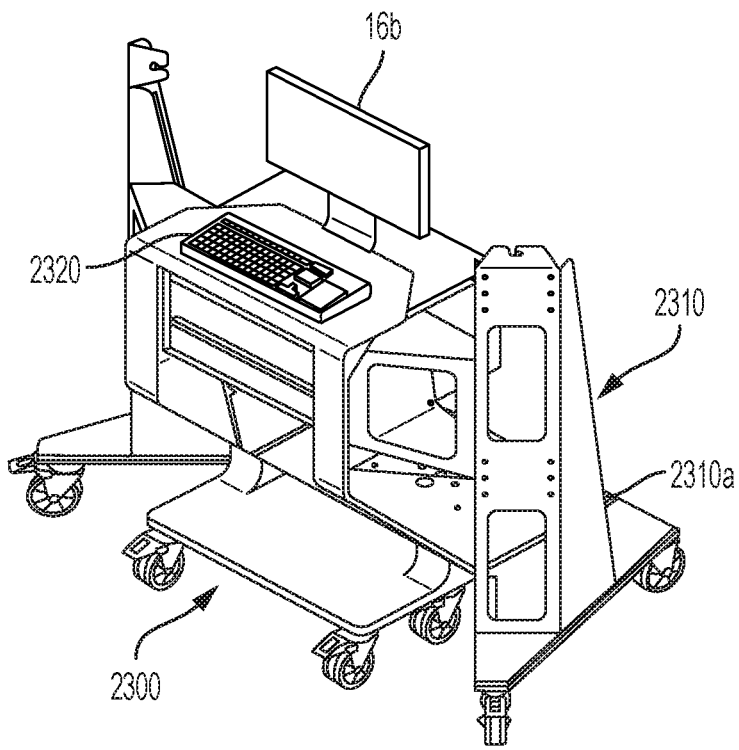
FIGS. 23a-c are views of a self-calibrating portable wheel aligner having a mobile console according to an embodiment of the present disclosure.
Figure 23B:
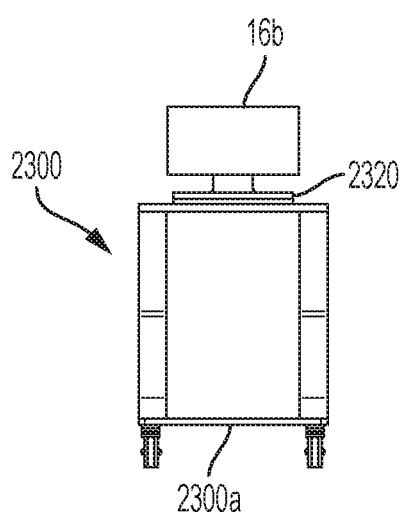
Figure 23C:
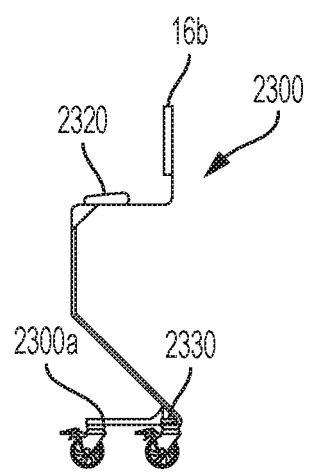

All of the components can be assembled on common base 16m and be an all-in-one portable aligner (FIG. 18). The monitor 16b of the display device can be mounted to the upright column 16f or to the keyboard shelf 16a. The camera pods 16g, 16h, upright column 16f, and base plate 16e comprise a self-contained unit that can be bolted to the mobile base 16m, to the floor, or to a suitable wall. The clamp hanger brackets 16c can be attached to the keyboard shelf 16a or to another localized structure such as a wall 18c, alignment lift, or freestanding post 18a, 18b (FIG. 20). The printer 16j could be installed in the console 16a or in another location more convenient for the end user. In a further embodiment shown in FIGS. 23a-c, a second mobile stand 2300 is used to support the monitor 16b of the display device and/or user input devices and/or printer 16j.

The disclosed 3D visual aligner includes a three-camera self-calibrating measuring system having a first camera pod 16g and a second camera pod 16h. First camera pod 16g comprises a forward-facing first camera 16p for viewing a pair of targets (such as the targets T of clamps 16d) when the targets T are attached to the left-side wheels of the vehicle to be aligned, and a calibration camera 16s extending from the rear of the pod 16g and facing the second camera pod 16h. Second camera pod 16h comprises a forward-facing second camera 16r for viewing a pair of targets (such as the targets T of clamps 16d) when the targets are attached to the right-side wheels of the vehicle to be aligned, and a calibration target 16q. The two forward facing cameras 16p, 16r are not rigidly connected to each other; that is, their relative position and orientation can change. The calibration camera 16s is rigidly attached to the forward facing "Left" camera 16g, and views the calibration target 16q that is rigidly attached to the forward facing "Right" camera 16r. The calibration camera 16s is used to measure the relative orientation of the forward facing cameras 16p, 16r in a conventional manner, as explained, e.g., in U.S. Pat. No. 6,968,282, incorporated by reference herein.

Figure 21:
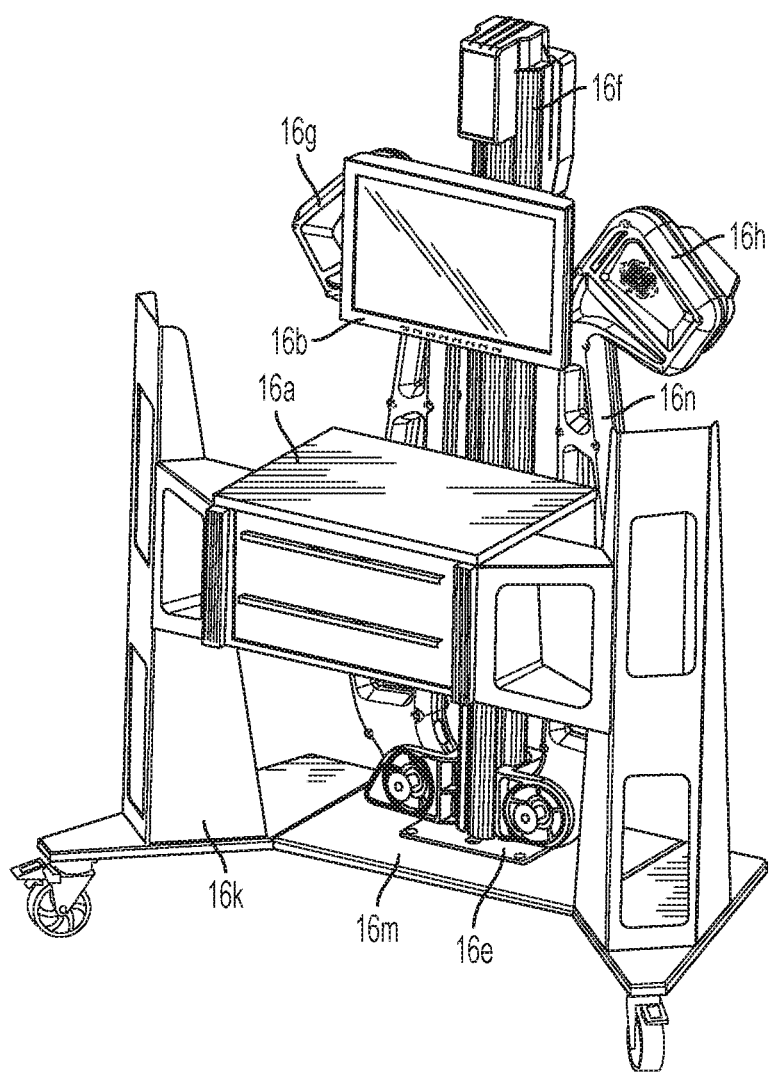

Camera pods 16g and 16h are supported by reversible arms 16n. Reversible arms 16n are attached to moveable carriage 17b by removable pins 17c (FIG. 19). Carriage 17b can move the arms 16n and camera pods 16g, 16h to follow the up or down motion of an alignment rack on which the vehicle to be aligned is parked. The arms 16n can be folded to minimize the width of the console 16a to facilitate moving the aligner. The arms 16n are shown in their folded position in FIG. 21.

In certain embodiments, all the major components of the disclosed aligner, including the two camera pods 16g, 16h, the display device, the printer 16j, and any other I/O device such as a keyboard and mouse, communicate with each other wirelessly. In such embodiments, a conventional wireless communication "hub" which controls the wireless communication is located at one of the components; e.g., one or both of the camera pods 16g, 16h. Also, the aligner can be connected to an external network (e.g., via the wireless communication hub) and communicate therewith, as explained in detail herein below.

Figure 22:
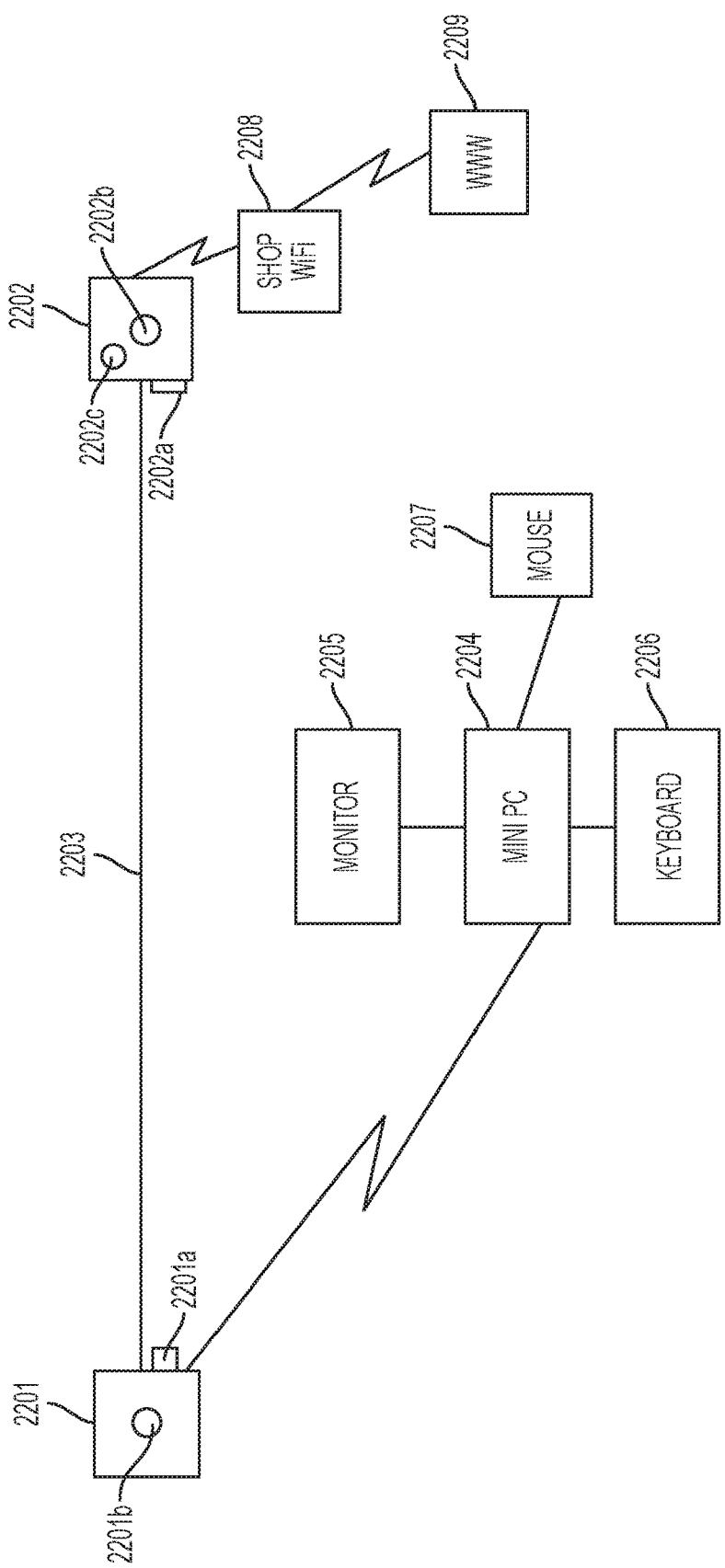

An exemplary embodiment is shown in the system block diagram of FIG. 22. Camera pods 2201 and 2202 communicate via an ethernet cable 2203. Camera pod 2201 has a conventional wireless communication device (not shown) for communicating with a mini personal computer 2204, which may have a monitor 2205, a keyboard 2206, and a mouse 2207, as well as a wireless communication device (not shown) for communicating with camera pod 2201. Camera pod 2202 also has a convention wireless communication device (not shown) for communicating with a shop wifi unit 2208, which can communicate with the internet 2209, in a manner discussed herein below.

The cameras and camera circuit boards in camera pods 2201, 2202 facing the wheel targets are identical, and both perform image processing. In certain embodiments, alignment calculations are also performed by the camera boards of pods 2201, 2202, and the results are communicated to the mini PC 2204, which serves a user interface and displays the alignment results. Note that the terms "camera" and "camera board" are used interchangeably throughout this document, as those of skill in the art will appreciate. The calibration camera 2201a mounted in the LH camera pod 2201 that looks across at the calibration target 2202a mounted in the RH camera pod 2202 does no image processing and, as a result has a simplified board. The image processing for the calibration camera 2201a is done by the board for the LH camera 2201b. There is also a drive-on camera 2202c mounted in the RH camera pod 2202 that views the vehicle as it drives onto the lift. It relies on the RH camera 2202b for image processing. In other embodiments, all image processing is performed by one camera board. Alternatively, the camera boards do not perform any image processing, and instead send raw images to the mini PC 2204 for processing.

In other features of embodiments of the disclosed portable aligner, in a "standard" configuration the monitor 16b of the display device, or the display device itself, is attached to column 16f by a bracket 17a (see FIG. 19). In an alternative configuration the monitor or display device itself is attached to the keyboard shelf 16a via a conventional monitor stand. In this embodiment the bracket 17a could be removed from the column 16f.

Base plate 16e, column 16f, moveable carriage 17b, arms 16n and camera pods 16g, 16h comprise a self-contained measuring system that can be attached to mobile base 16m, to the floor, or to a suitable wall or upright structure. Base plate 16e contains a plurality of holes that can be used to attach base plate 16e to mobile base 16m. This same plurality of holes could be used with floor anchors to attach the measuring system to the floor. Column 16f also has multiple brackets 17a, 17d (see FIG. 19) that in a standard configuration mount the monitor 16b or display device and the keyboard shelf 16a. In an alternative configuration, these brackets 17a, 17d are used to attach the measuring system to a wall or other suitable structure. To support this alternative configuration, arms 16n can be flipped via removable pins 17c.

Referring now to FIGS. 18 and 20, clamp hanger brackets 16c are attached to clamp hanger structures 16k using a plurality of conventional fasteners. To accommodate end user preferences for clamp storage location, brackets 16c are easily removable and can be attached to another structure 18c using conventional fasteners. To further accommodate end user preferences for clamp storage location, the entire clamp hanger structure 16k can be removed from the mobile base 16m and attached to the floor using conventional floor anchors.

A wireless connection between the printer 16j and the camera measuring system allows the printer to be installed in certain embodiments in the keyboard shelf 16a, or at any other user preferred location within the alignment shop, or within a nearby office or room.

A wireless connection between the display device, the wireless communications hub, the user input devices such as keyboard and mouse, and/or the printer 16j allows for the addition of a second fully detached console in a further embodiment. This configuration allows a mobile camera measuring system with a separately mobile user input station. In one embodiment shown in FIGS. 23a-c, a relatively small, more portable satellite console 2300 is provided that docks with the main console 2310. This satellite 2300 has a display device, a conventional power source (not shown) such as a lithium ion battery or equivalent, and optionally an input device such as a keyboard 2320 for the user to enter data. It is self-sufficient on power for a period of time, and communication to the main console 2310 is completely wireless. Such a portable console 2300 allows the user to undock the satellite and move it to a location that allows visibility of the readings on the display 16b during an alignment. When not in use, the satellite 2300 docks back to the main console 2310 and the two units nest together to form one unit. The satellite 2300 can dock with a portable or fixed station. When docked with a portable station such as main console 2310, the two units function and move as one unit.

The docking functionality can be achieved by a number of well-known techniques. In one embodiment, mechanical latching/connecting device(s) secure the satellite console 2300 when docked. This mechanical device allows for simple and quick docking and undocking of the satellite console 2300 to the main console 2310. Another way of implementing the docking functionality is a magnetic mechanism 2330 to allow for simple and quick docking and undocking. This mechanism 2330 can be an electromagnet that is engaged/disengaged with the press of a button. Alternatively, it can be a permanent magnet that is engaged by simply placing the satellite console base 2300a close enough to the main console base 2310a to engage the magnet 2330. To disengage the permanent magnet 2330, a foot lever or other similar mechanism can be used to break the magnetic attraction between the two consoles 2300, 2310.

Figure 24A:
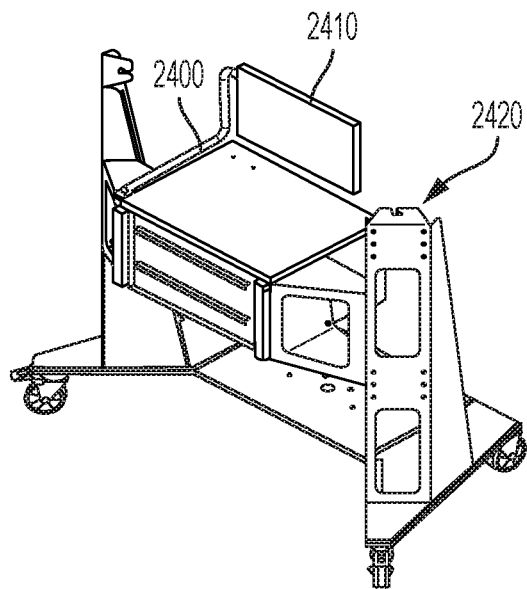
FIGS. 24a-c are views of a self-calibrating portable wheel aligner having a movable display according to an embodiment of the present disclosure.
Figure 24B:
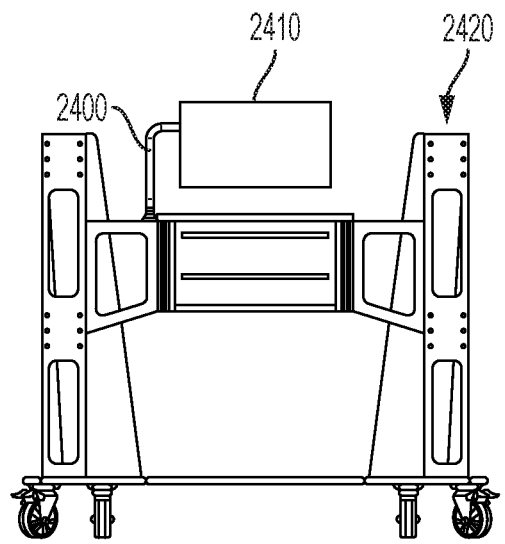
Figure 24C:
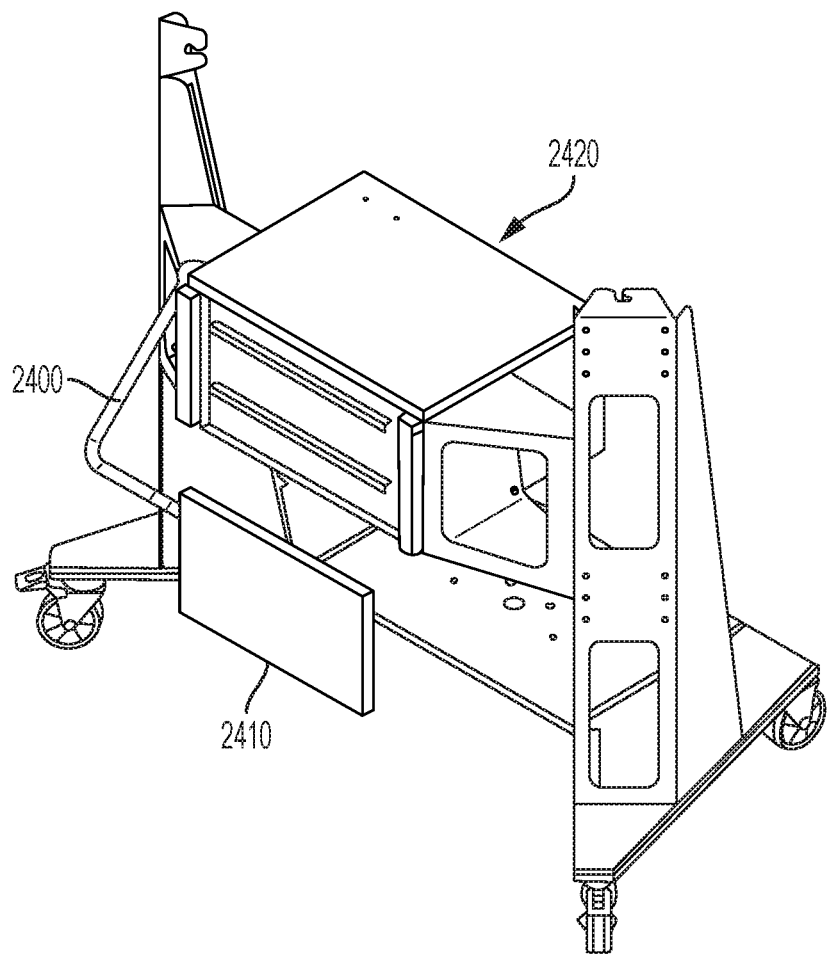
Figure 25A:
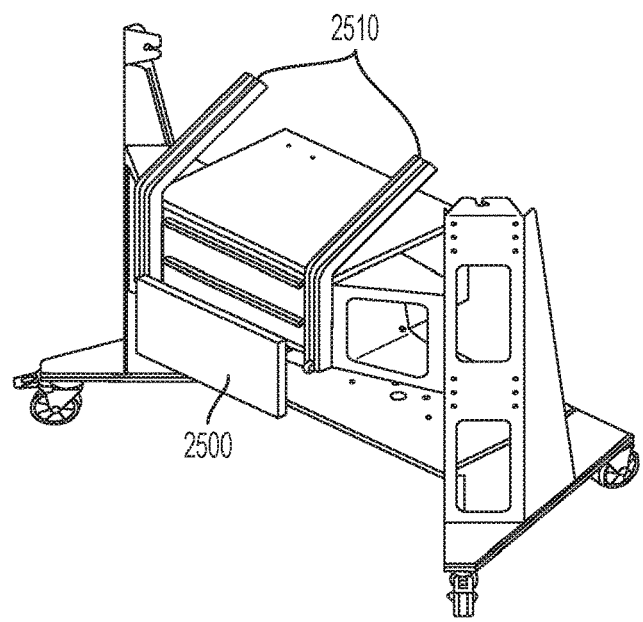
FIGS. 25a-b are views of a self-calibrating portable wheel aligner having a movable display according to another embodiment of the present disclosure.
Figure 25B:
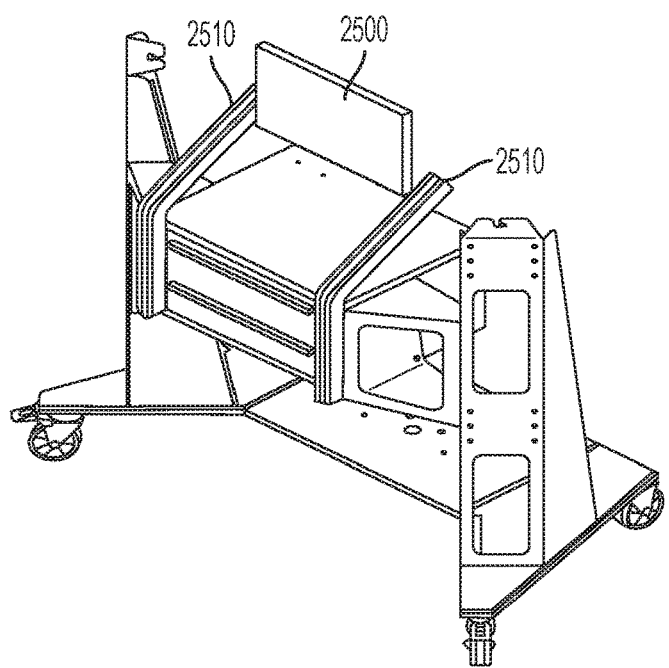

When under a vehicle making alignment adjustments, it is difficult if not impossible to see the main display. A solution for alleviating the viewing disadvantages of having the main display at the front of the vehicle is to make the display height adjustable on the console, as shown in FIGS. 24a-25b. Adjusting the display to any height between the standard viewing height to a height that is near the ground helps viewing the display from underneath the vehicle. One way to provide this type of adjustment is to mount the display device on a conventional-type pivoting arm(s) that adjusts to set upper and lower heights, as shown in FIGS. 24a-c. The arm(s) 2400 hold the display 2410 (which could be a monitor, a smart TV, etc.) above the console 2420 when in the up position (FIGS. 24a-b) and swing the display down in front of the console 2420 when in the down position (FIG. 24c). Cable management could be maintained in the adjustable arm(s) 2400. Referring now to FIGS. 25a-b, another way to provide the desired adjustability is to slidably mount the display 2500 on rails 2510 that allow adjustment from the standard height, to near the ground, and between (FIGS. 25a-b). Either of these mounting techniques could be implemented on a satellite console such as console 2300 described herein above with reference to FIGS. 23 a-c, and/or a main console such as shown in FIGS. 25a-b. Cable management could be maintained in the rail(s) 2510.

Aligner with Advanced Analytics

Embodiments of an aligner having advanced analytics will now be described, which depends on high-frequency data collection and continuous or semi-continuous analysis of measurements. The disclosed advanced analytics determine whether certain measurements are indicative of operator error and/or equipment faults. The aligner uses the advanced analytics to inform the operator of the error or fault and/or correct for the error or fault. This functionality is enabled by the aligner's very fast measurement process which; for example, calculates multiple target poses for the vehicle wheels as they are moved, using optimized iterative algorithms to estimate the position and orientation of the reference targets. See, e.g., U.S. Pat. Nos. 5,535,522; 7,855,783; 6,871,408; and 7,069,660; and U.S. Patent Application Publication 2016/0195388, hereby incorporated by reference herein.

Aligner Architecture

Figure 16:
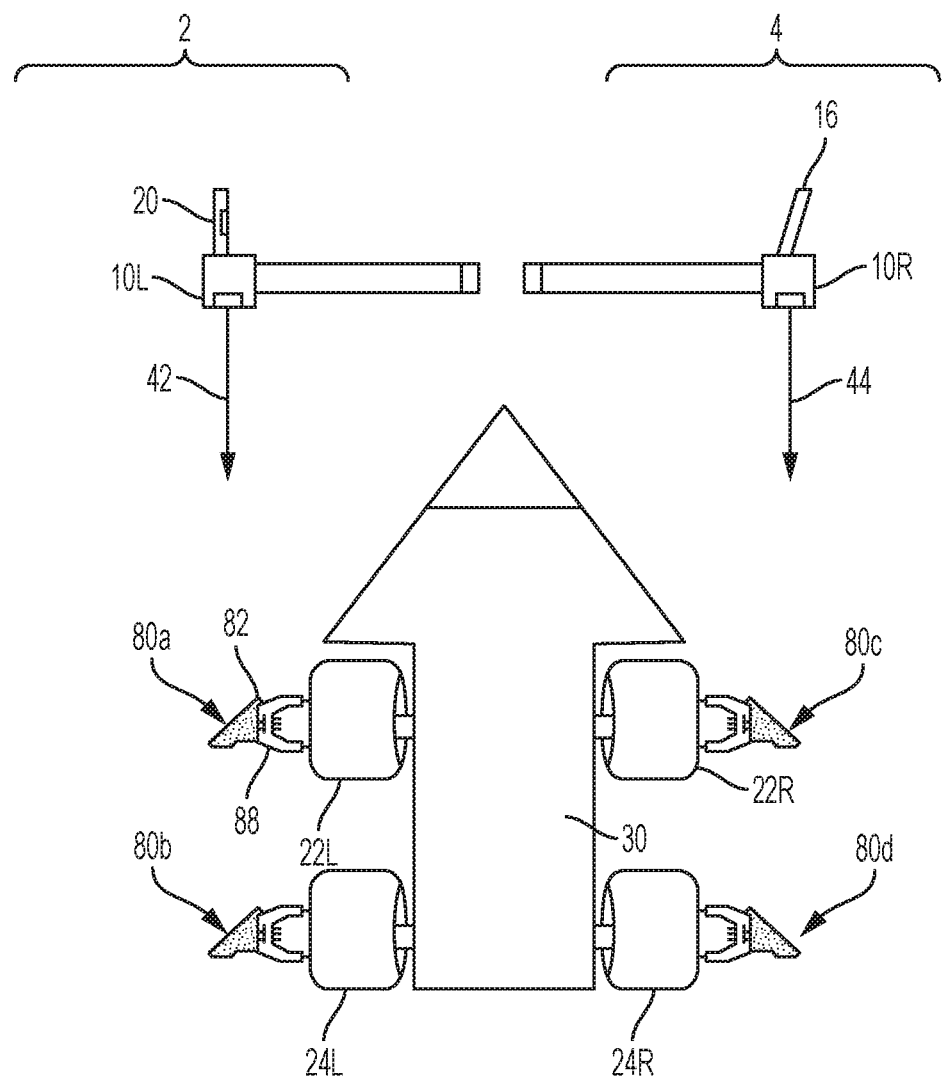
FIG. 16 is a schematic top plan view of a self-calibrating wheel aligner with which the disclosed system and methodology can be implemented.

FIG. 16 is a schematic top plan view of certain elements of a computer-aided, 3D motor vehicle wheel alignment system ("aligner"), similar to that disclosed in U.S. Pat. No. 6,968,282 discussed herein above. The aligner of FIG. 16 can be used to implement the disclosed techniques. In particular, the aligner of FIG. 16 comprises a left camera pod 2 and a right camera pod 4 that are used to align wheels of a motor vehicle. The terms "left" and "right" are used for convenience, and are not intended to require a particular element to be located in a particular location or relationship with respect to another element.

Arrow 30 of FIG. 16 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 24L, 22R, 24R, respectively. Each alignment target generally comprises a plate 82 on which target information is imprinted and a clamping mechanism 88 for securing the target to a wheel. A left camera pod 2 comprises left alignment camera 10L. Left alignment camera 10L faces the vehicle and views the left side targets 80a, 80b along axis 42. Right camera pod 4 comprises a right camera 10R that faces the vehicle and views the right side targets 80c, 80d along axis 44. Left camera pod 2 also includes a calibration camera 20 mounted perpendicularly to camera 10L. Calibration camera 20 views a calibration target 16 attached to right camera pod 4, to determine the positions of alignment cameras 10L, 10R relative to each other.

The disclosed aligner further comprises a data processor (not shown), such as a conventional personal computer (PC), having software with instructions to cause the data processor to perform the calculations described herein electronically.

Figure 17:
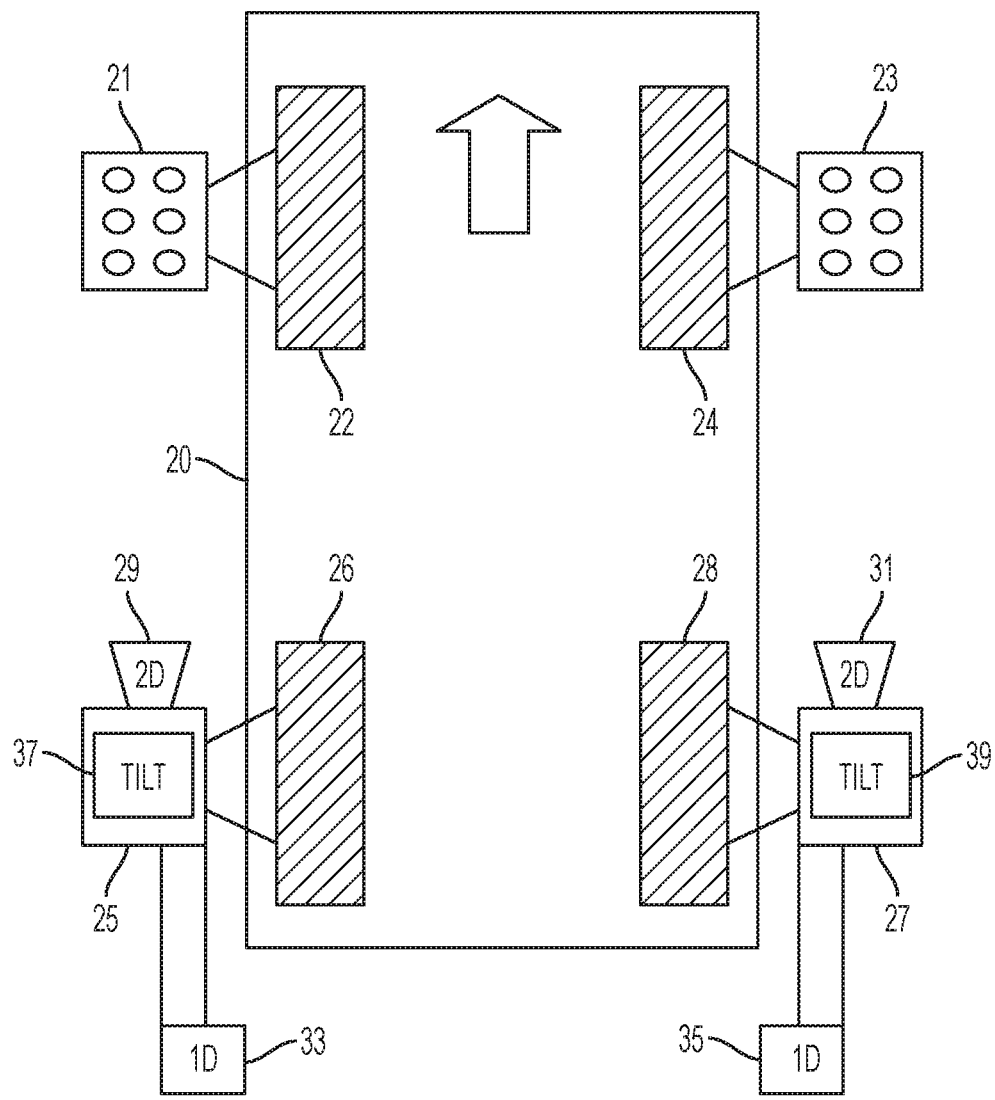
FIG. 17 is a schematic top plan view of a hybrid wheel aligner with which the disclosed system and methodology can be implemented.

The method and apparatus described herein is also applicable for use with a hybrid aligner system similar to that described in U.S. Pat. No. 7,313,869, which is hereby incorporated by reference in its entirety, and its continuation patents. FIG. 17 shows a schematic representation of an exemplary hybrid aligner system useable with the presently disclosed method and apparatus, including a pair of passive targets 21 and 23 mounted on respective wheels 22 and 24 of the vehicle, which are front steering wheels in this first example. A pair of active sensing heads 25 and 27 are adapted for mounting in association with other respective wheels 26 and 28 of the vehicle, in this case the rear wheels. Each active sensing head includes a camera 29 or 31 for producing 2D image data, which is expected to include an image of one of the targets 21, 23 when the various heads are mounted to the respective wheels of the vehicle. The system also uses two conventional (1D) angle sensors 33 and 35 to measure the relative angles of the active sensing heads 25 and 27 in the toe plane, and a pair of tilt sensors 37, 39 to measure tilt, typically camber and pitch, of heads 25, 27.

Fast Measurement Process

A key technology enabling the disclosed aligner and the functionality described herein is a very fast measurement process. For this innovation, the core measurements of interest are the poses (positions and orientations) of targets that are rigidly mounted to the vehicle wheels. Performing a fast measurement process thus equates to performing measurements of target pose very rapidly. In imaging aligners, computing pose rapidly involves performing optimized image processing and applying optimized iterative algorithms to estimate the position and orientation of the reference targets. The high speed measurement process provides for many updates and checks to be performed during the course of a wheel turning processes which may only take several seconds. To measure the pose of wheel mounted targets from individual cameras, such cameras 10L and 10R of FIG. 16, or cameras 16p, 16r of FIG. 18, it is essential to have calibrated cameras. Calibrated cameras are ones which have had their internal geometry (focal length, camera center point, lens distortion) characterized by a camera calibration process.

Examples of well-known camera calibration processes are the Heikkila method; Zhang's method; the Faugeras—Luong method; the Hartley—Zisserman method; and the Triggs method. To compute the 3D pose of a target from a single 2D camera it is further required to have knowledge of the geometry of the target that is being observed. With knowledge of the target geometry and knowledge of the internal camera geometry, it is possible to compute the 3D pose of that target based on a single 2D image. An example of a commercially available "fast" camera usable to implement the disclosed aligners is the VC Z series camera available from Vision Components GMBH of Ettlingen, Germany.

The process of computing target pose is conventional, and starts with acquiring an image of the wheel mounted target. This image is then processed to identify image feature points that correspond to reference fiducials in the target. These reference image points are then associated with reference fiducial points in the target. Finally, an iterative pose estimation process is performed. Pose estimation answers the question, "Where does a target need to be located, and how must it be oriented, to produce the pattern of image feature points that I measured?"

In the disclosed aligners, the entire measurement process (image acquisition, image processing, image feature point to target fiducial point correspondence, and pose estimation) is performed repeatedly in a loop for all targets used until target pose information is no longer needed for the alignment process. To acquire measurements very rapidly (for example, greater than 20 poses per second) it is necessary to perform all four steps rapidly. The data processing steps must be implemented with highly efficient algorithms and they must also be implemented on processors with architectures that are optimized for the image processing and numerical linear algebra steps used in the data processing algorithms. Examples of well-known processors with architectures optimized for image processing and numerical linear algebra include DSPs (Digital Signal Processors); GPUs (Graphics Processing Units); FPGAs (Field Programmable Gate Arrays); and ASICs (Application Specific Integrated Circuits). Examples of highly efficient data processing algorithms include Gaussian filtering; gradient descent optimization; Sobel edge detection; Canny edge detection; SURF feature point detection; and optical flow point tracking. An example of a commercially available processor with architecture optimized for the application of this disclosure is Model TDA2x ADAS DSP/ARM System-on-Chip processor, available from Texas Instruments of Dallas, Tex.

In certain embodiments, the data collection procedures and advanced analytics described herein below with reference to FIGS. 1-15 are performed using "intelligent cameras" that are fast and perform all the data processing for the aligner, including serving the user interface, preprocessing image data, and calculating alignment parameters. More particularly, the intelligent cameras (e.g., the camera pods 16g, 16h shown in FIG. 18) acquire images and preprocess the image data. Preprocessing generally includes manipulating image data to prepare it for use in calculating alignment parameters, such as alignment angles. Examples of well-known preprocessing operations include background subtraction, gradient calculation, derivation of positional data, and data compression for reduced bandwidth. Preprocessing of image data is described in detail, for example, in U.S. Pat. No. 7,069,660. Preprocessed image data from both cameras is used to calculate alignment angles, which are served to a display device. In other embodiments, only one of the two cameras performs the processing and calculating of alignment parameters.

The data collection procedures and advanced analytics described herein below with reference to FIGS. 1-15 are incorporated into embodiments such as the portable aligner shown in FIGS. 18-25b. In such embodiments, the cameras of camera pods 16g and 16h are intelligent cameras as just described. In still further embodiments, the advanced analytics of FIGS. 1-15 are incorporated into a hybrid aligner system as described herein above and in U.S. Pat. No. 7,313,869, hereby incorporated by reference in its entirety, and its continuation patents including U.S. Pat. No. 7,313,869, also incorporated by reference in its entirety.

Measurement, Detection, Correction, and Warning of Problems During Runout Compensation To calculate the alignment of the vehicle, it is well-known that the aligner must locate the spindle of each wheel. To locate the spindle, the aligner typically measures the pose of the target attached to the wheel in at least two places before and after the wheel is rotated. Wheel spindle calculations are well-known, and exemplary algorithms described for such calculations are described in U.S. Pat. Nos. 5,535,522 and 6,148,528. To locate the spindle accurately, the vehicle must roll around a single axis. Any variation from a single axis roll will cause errors. This process is commonly referred to as runout compensation or rolling runout compensation. Using fast processing cameras as discussed herein above, the disclosed aligner can take discrete measurements at many places during the rolling procedure. With these measurements, the disclosed aligner can take many axis calculations, as well as other calculations looking for potential errors and solutions. Some of these errors might be a bump in the path of the vehicle's roll, a slide of the skid plates, or multiple axes of rotation; e.g., an inadvertent turning of the steering wheel, or a wheel wobble due to bad bearings. See, e.g., U.S. Patent Application Publication 2016/0195388.

There are other useful well-known calculations that can be made during the rolling process; for example, the center of the wheel can be calculated by looking at the path and pose of the targets through the rolling process. This can be then used to establish the vehicle reference plane, or vehicle dimensions.

These advantageous fast measurements are not restricted to the cameras looking at the wheels; the calibration camera (such as camera 20 of FIG. 16 or camera 16s of FIG. 18) can measure the calibration of the aligner very frequently and can be used to detect unwanted motion of the cameras during the rolling procedure. This motion will cause errors in the cameras' pose measurements of the targets and ultimately create errors in the spindle and alignment measurements. It is therefore desirable to detect camera motion, and not use the measurements obtained during the time the camera(s) moved.

In typical imaging wheel alignment systems, one acquires images of vehicle wheels with clamps that are rigidly mounted to each individual wheel rim, each clamp carrying a target that is viewed by one of the cameras. Examples of such clamp/target assemblies are target/clamp 80a, 88 of FIG. 16 and target/clamp 16d of FIG. 18. In the course of performing a wheel alignment, it is standard procedure to perform runout compensation after attaching the clamps/targets by rolling the vehicle wheels in a back and forward manner. When doing so, it is assumed that the reference target rotates only about the axis of rotation of its associated wheel. It is also assumed that the wheel center travels in a straight line. In the real world, often with crooked alignment lifts and various obstacles laying on the lift surface, this ideal motion is not achieved. If these assumptions are not true they can degrade the accuracy of alignment angle measurements.

The present disclosure addresses this problem by rapidly acquiring and recording measurements of wheel-mounted target pose (i.e., target position and orientation) throughout the wheel rolling process and analyzing these measurements to check the wheel alignment assumptions.

Figure 1:
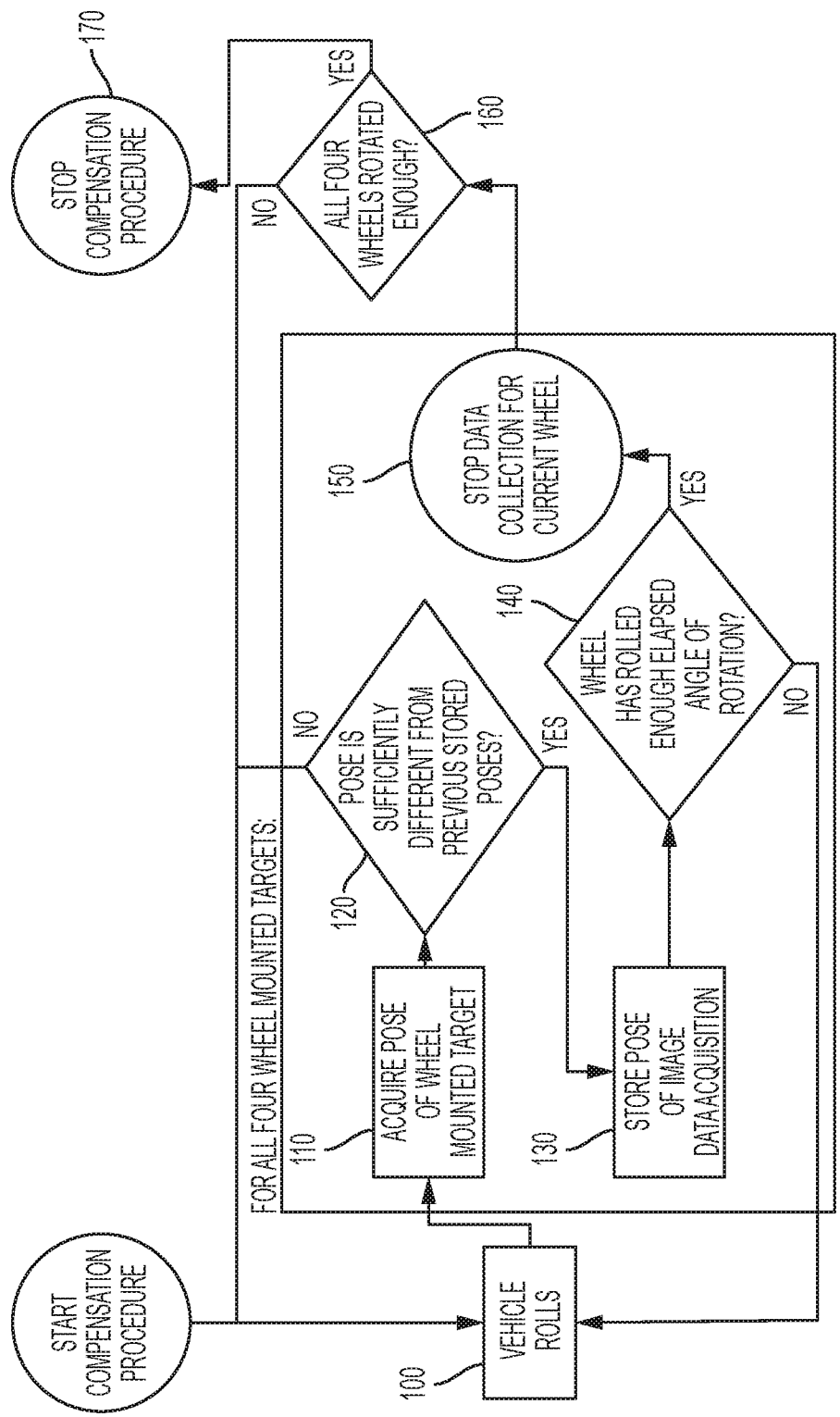
FIG. 1 is a flow chart illustrating a data collection procedure for the compensation roll according to an embodiment of the present disclosure.

The process in which data is collected by the disclosed aligner is depicted in FIG. 1. The vehicle is rolled continuously without a pause, and a number of poses of each wheel target is acquired; for example, about twenty (20) different poses if the vehicle is rolled quickly. In certain embodiments, the minimum number of poses of the target comprises at least one pose for every five degrees of wheel and target rotation. The compensation data acquisition process continues until each wheel rolls through an elapsed angle of rotation; for example, 35 degrees of rotation. More particularly, at step 100 the vehicle is rolled, and at step 110 a pose of the target on a wheel is acquired. The pose is checked at step 120 against previously-stored poses for that wheel, and if it is sufficiently different, it is stored at step 130. At step 140 it is determined whether the wheel has rolled enough (e.g., 35 degrees). If not, another pose is acquired for that wheel (step 110) and the process repeats. When the wheel has rolled enough, data collection stops at step 150. When it has been determined all four wheels have been rotated enough (step 160), the procedure is stopped at step 170.

Figure 2:
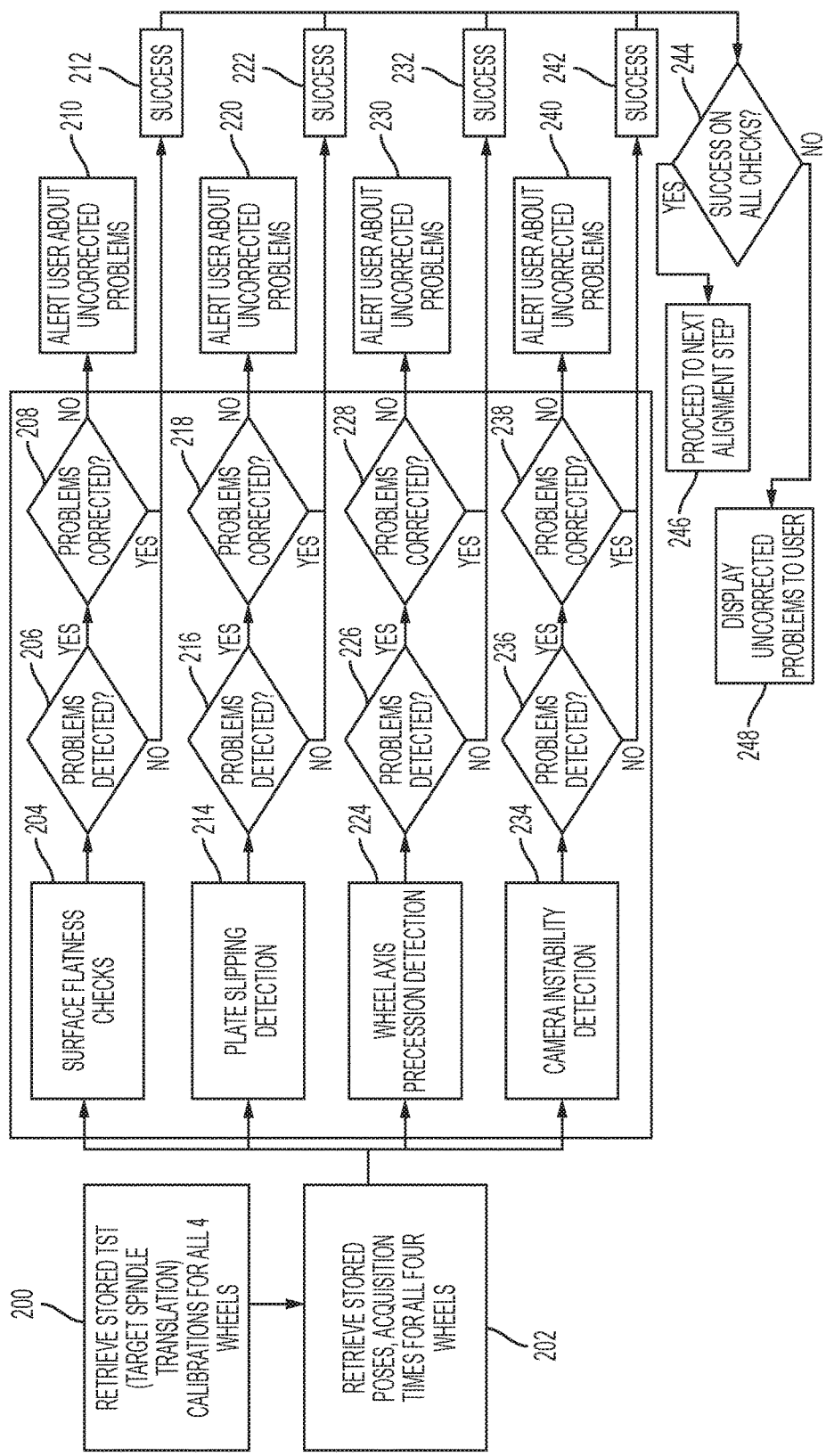
FIG. 2 is a flow chart illustrating a plurality of diagnostic checks according to an embodiment of the present disclosure.

Once the compensation data acquisition process completes, the poses logged for all four wheels are then passed into through a series of diagnostics checks in a "Compensation Analytics Engine" shown in FIG. 2. Problems with the alignment lift itself can be detected and in some cases compensated for without requiring that the user performs the compensation roll again. Some exemplary diagnostics checks are schematically described in FIG. 2.

One set of inputs for the Compensation Analytics Engine of FIG. 2 are the stored poses acquired by the process of FIG. 1 (step 202). Another set of inputs for the Compensation Analytics Engine depicted in FIG. 2 are the target spindle translation (TST) vectors for each of the four wheels (step 200). These well-known calibrations can be performed offline, or they can be computed from data collected during the compensation roll in conjunction with outside information of the target center point distance to the wheel rim along the wheel axis normal direction. Those of skill in the art will understand that the TST vectors, when anchored at the wheel mounted target centers, define the wheel center points. More specifically, a TST vector is the translation ray from the target coordinate system to the center of the wheel rim. As a ray, the origin of the TST is anchored to the origin of the target coordinate system, and the direction of the TST ray is fixed with respect to the target coordinate system. The TST ray thus transforms in tandem with changes to the pose of its associated target. The reason for defining TST in such an invariant manner is to allow wheel center points to be recomputed as wheel positions change, upon measuring target poses in the new wheel position (i.e. as the vehicle steering wheel is turned or as adjustments are made to individual camber and toe angles).

TST vectors can be computed using a number of well-known techniques. One technique employs a "3D coordinate measurement machine," wherein the wheel target comprises suitably positioned reference fiducial markers. These points are measured and then used to define the origin point and coordinate axes of the target coordinate system. An additional set of 3D coordinates are obtained from tips of the three or four symmetrical wheel clamp "claws" of the clamp that holds the wheel target on the wheel. In a conventional self centering clamp, such as clamp assembly 16*d* shown in FIG. 18, the center of these "claw" points corresponds to their center point, which also corresponds to the center of a wheel rim when the clamp is mounted to a wheel. The translation from the target to the center of the clamp "claws" is thus measured in the coordinate measurement machine's coordinate system, and then transformed in a conventional manner to the target coordinate system defined from the reference fiducial markers on the target face.

As is clear from FIG. 2, there are multiple independent analytics checks which can be performed using the logged target poses and the TST vectors as inputs. Each analytic test (step 204, 214, 224, 234) is essentially a data integrity check that checks an assumption of the compensation process. The basic format of each check follows a similar pattern. For each test, the large quantity of data collected is used to check for a problem in the compensation step (steps 206, 216, 226, 236). If a problem is encountered, the aligner attempts to correct for the problem (steps 208, 218, 228, 238). The user is alerted if a problem cannot be corrected (steps 210, 220, 230, 240); for example, by displaying the problem on a display device (step 248). If all problems are successfully corrected and/or no problem(s) detected (steps 212, 222, 232, 242), at step 244 the alignment proceeds to the next alignment step (step 246). The analytics checks do not need to be performed in a predefined sequence. They can be run independently of each other.

Surface Flatness Checks

Figure 3:
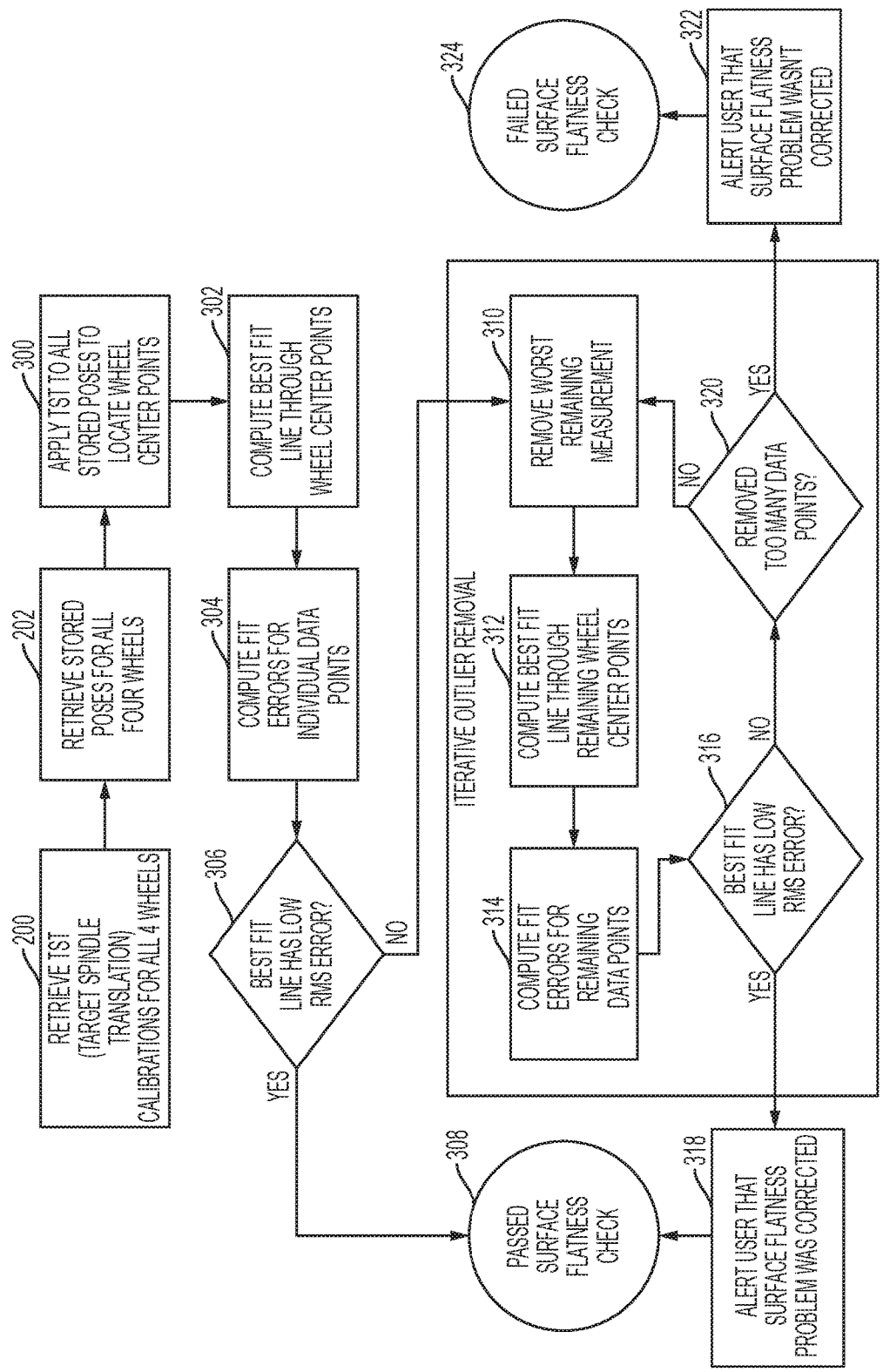
FIG. 3 is a flow chart illustrating a surface flatness checking procedure according to an embodiment of the present disclosure.

One of the assumptions used when performing compensation is that the surface over which the vehicle rolls is flat. In cluttered real world scenarios, this may not necessarily be the case. As those of skill in the art will appreciate, the alignment lift can possess large discontinuities in its surface. Using the large quantity of data collected during the compensation roll in the disclosed aligner, these surface continuities can be detected and in some cases corrected for. An embodiment for performing the surface flatness checks at steps 204-212 of FIG. 2 as part of the compensation procedure is illustrated in greater detail in FIG. 3. The process of FIG. 3 is performed for all four vehicle wheels.

The basic principle in the surface flatness detection algorithm is to employ the fact that the center of a wheel rolling on a flat surface moves in a straight line. In this embodiment, the center of the wheel is computed by applying the TST (Target Spindle Translation) vector to each target pose that was saved as part of the data acquisition process in FIG. 1 (step 300). The best fit line through the set of all computed wheel center points is then computed (step 302) as well as fit errors for individual data points (step 304). Deviations from a straight line indicate error. If the RMS (root mean squared) deviation from the best fit line is sufficiently low (step 306); i.e., lower than a predetermined threshold, then the lift surface is declared to be flat (step 308) and the process proceeds to the next analytics check.

A more complicated situation arises when the best fit line through the lift surface does not have a sufficiently low RMS fit error at step 306. In this case, the iterative outlier removal process is started (the bottom box inside of FIG. 3). In this process, the worst measurement is removed (step 310), and the best fit line is recomputed without this worst measurement (step 312), along with the fit errors for individual data points (step 314). "Worst" here is the wheel center point with the largest deviation from the best fit line. If the RMS error from the new best fit line is sufficiently low (step 316) then the process terminates successfully (step 318). If the RMS error at step 316 is still larger than the tolerance then the worst remaining measurement is excluded, the best fit line is recomputed, and the RMS error check is performed against the predetermined tolerance (steps 310-316).

This process of steps 310-316 iterates until either the best fit line achieves a sufficiently low RMS error or until an excessive number of data points are removed, which is checked at step 320. The bare minimum number of 3D points required to uniquely specify a 3D line is two. Using only two points is inadmissible for this test, however, as two points will always form a perfect best fit line with no error whatsoever (defeating the purpose of this test). In practice, the minimum number of measurements required is at least 6.

If outlier measurements are removed and the RMS best fit line error is sufficiently low, then only those poses corresponding to the inlier wheel center point measurements are used to compute the wheel axis. In this case, the inconsistent rolling surface is corrected for and the process progresses to the next check.

If too many outlier measurements are removed, then the non-uniform rolling surface cannot be compensated for. The surface flatness check fails and the user is alerted at step 322 that the observed surface non-uniformity couldn't be corrected. In such a scenario, the runout compensation process cannot be completed successfully (step 324).

There are various ways in which surface flatness checks could be implemented. In the above-described embodiment, reference was made to the RMS error of a best fit line fitted through the 3D wheel center points. One could use additional optimization metrics other than the RMS error. For example, one could use changes in the slope of the best fit line as the criteria to minimize other than the RMS best fit error.

Plate Slipping Detection

Wheel alignments are performed by the disclosed aligner on a conventional alignment lift, a specialized piece of equipment with movable plates under the vehicle wheels ("turn plates" for the front wheels and "slip plates" for the rear wheels). The plates can be set by the technician in either a locked or an unlocked state. When locked, the plates do not translate when forces are applied to the surface. When unlocked, the plates translate freely when a force is applied. This allows for vehicle wheels to translate and rotate without inducing additional stress in the vehicle suspension. During certain wheel alignment procedures such as runout compensation, however, it is necessary for the plates to be locked and to not translate freely when the vehicle rolls over them. Free translation of a wheel means that it is free to translate without a proportional rotation about the wheel axis. Free translation of wheels without corresponding rotation can cause errors in runout compensation.

Figure 4:
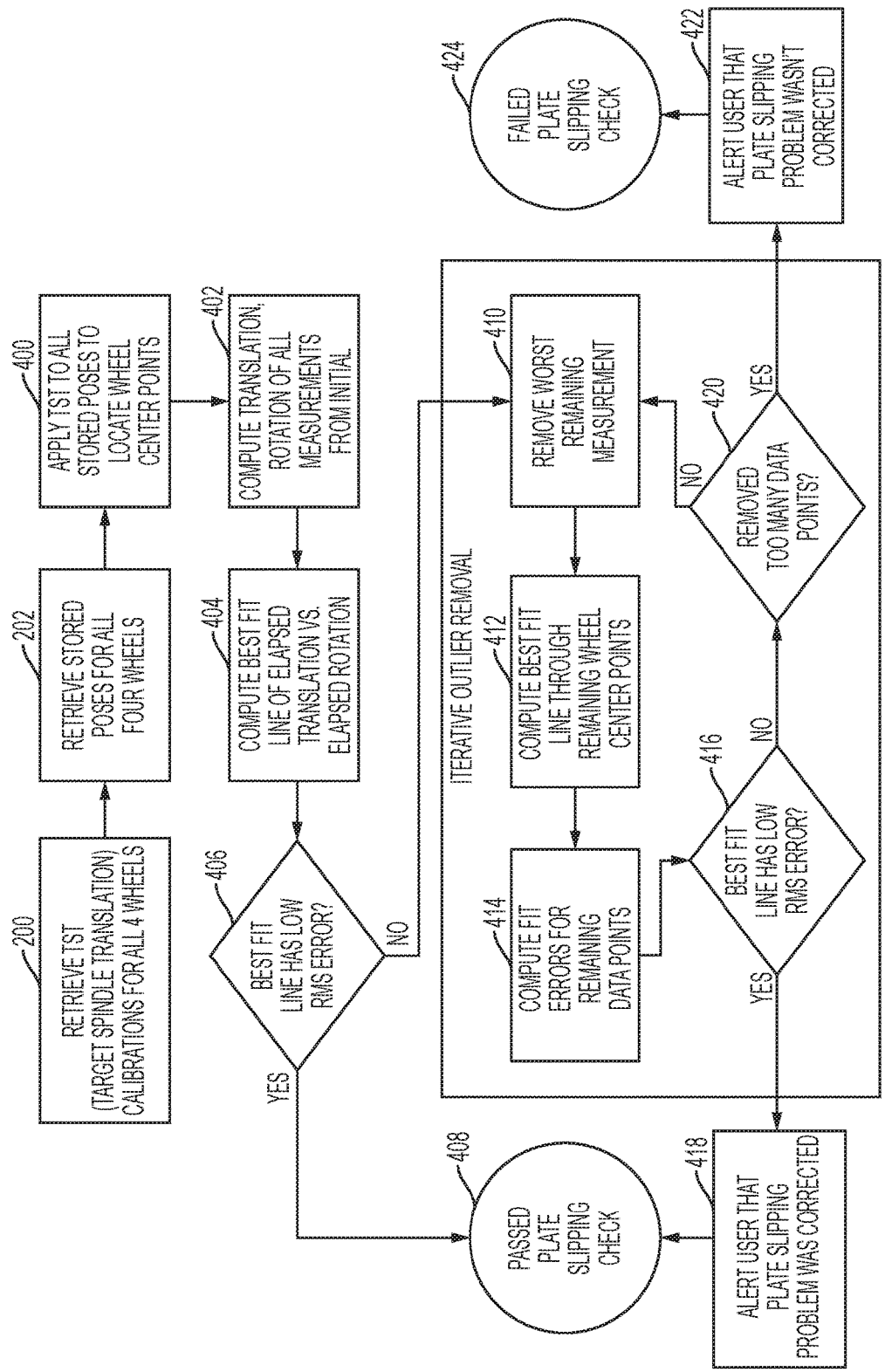
FIG. 4 is a flow chart illustrating a plate slipping checking procedure according to an embodiment of the present disclosure.

The process for detecting plate slipping at steps 214-222 of FIG. 2 as part of the compensation procedure is illustrated in greater detail in FIG. 4. Once the runout compensation data acquisition process of FIG. 1 is complete, the measured target poses and TST calibration vectors are used as inputs to the plate slipping check (steps 200, 202).

As the vehicle rolls, for each wheel there must be an elapsed angle of rotation that is proportional to the linear travel distance. The linear travel distance is the distance translated by the center of each wheel. Formula 1 below shows the ideal proportional relationship between wheel center translation and elapsed angle of wheel rotation (in radians). This proportional relationship is used to perform a linear least squares best fit of wheel translation distance vs. angle of rotation. Errors of predicted vs. measured rotation are then used to detect and in some cases correct for observed instances of translation without rotation.

$$d_{trans} \propto \theta_{rot}$$

Formula 1: Ideal Wheel Travel Distance and Elapsed Angle of Rotation

Figure 5:
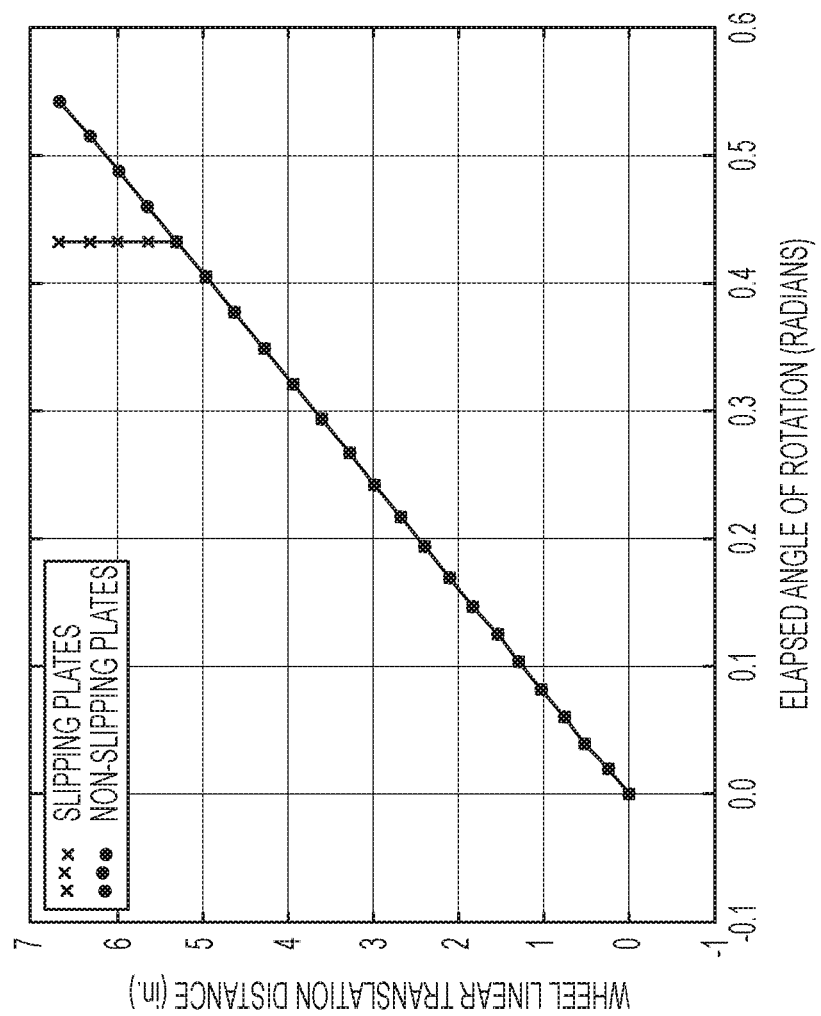
FIG. 5 is a graph depicting wheel translation vs. rotation for determining plate slipping.

FIG. 5 shows two plots. The dotted plot shows a roll of a typical radius wheel (12.4") rolling with the ideal proportional relationship between wheel translation and rotation. The plot of x's shows a wheel roll of the same radius but with a slip plate unlocked and the wheel experiencing translation without rotation at the end of the vehicle motion.

As is schematically depicted in FIG. 5, the error metric for this test is the deviation from the best fit line of wheel linear translation distance vs. elapsed angle of rotation. For the above comparison of a plate slipping vs. non-slipping scenario, we see the plot of best fit line error vs. rotation angle.

Figure 6:
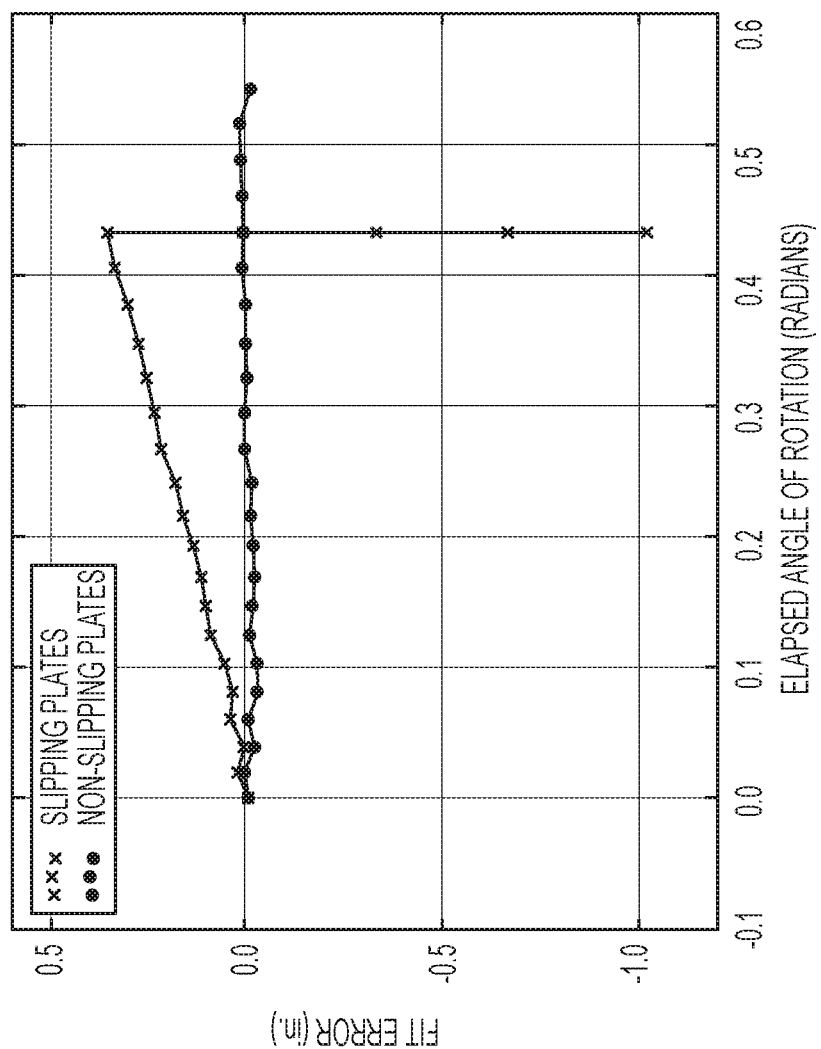
FIG. 6 is a graph depicting fit error vs. rotation for determining plate slipping.

As shown in FIG. 6, instances of translation without rotation are readily detected by examining errors in the best fit line. The largest best fit line errors in the plate slipping scenario are significantly larger than errors in the non-slipping scenario. By iteratively removing the points where slipping occurs, the best fit line can be significantly improved.

Referring now to FIG. 4, the center of each wheel is computed by applying the TST (Target Spindle Translation) vector to each target pose that was saved as part of the data acquisition process in FIG. 1 (step 400). The translation and rotation from the initial point is then computed for all poses (step 402). The best fit line of elapsed translation versus elapsed rotation is then computed (step 404). Deviations from a straight line indicate error. If RMS error of the best fit line as computed in FIG. 4 is sufficiently low when using all stored pose measurements i.e., lower than a predetermined threshold (typically <0.025") at step 406, then the plate slipping check passes (step 408) and the process proceeds to the next step.

If the RMS error is not below this threshold then an instance of translation without rotation has been detected. The iterative outlier removal process then runs. At each iteration, the worst measurement (with the largest absolute error in the best fit line) is removed (step 410). Translations and rotations are recomputed (taking care to adjust input poses for the omitted measurement) and the translation vs. rotation best fit line is recomputed (step 412) along with fit errors for the remaining data points (step 414). If the RMS error is sufficiently low after omitting this worst point (step 416) then the process completes (steps 418, 408) and runout compensation proceeds to the next step. This process of omitting the worst remaining point of steps 410-416 iterates until either a sufficiently good best fit line RMS error is achieved or until too many points have been removed (this is checked at step 420), at which time the user is alerted at step 422 that the observed plate slipping problem couldn't be corrected, and the plate slipping check fails (step 424).

In the above-described embodiment of plate slipping detection/correction, the criteria for detecting/correcting plate slipping is a proportionality check between wheel center point translation vs. wheel rotation. With time-tagged pose data, in further embodiments the elapsed angle of rotation is interpolated to all measurement times on all wheels. With angle of rotation and time, angular velocity can be computed. If any time during the rollback, one wheel shows a much lower angle of rotation than the other wheels under observation, then this information could be used to detect plate slipping.

Wheel Axis Precession Detection

The principle quantities of interest measured during the compensation roll are the wheel axes. The wheel axes are the (virtual or real) spindles about which each wheel rolls. It is assumed during the compensation process that all measured rotation occurs about wheel axes. This might not be true, however. If a wheel does not closely approximate a circle during a roll then there will not be a unique wheel axis of rotation. For example, if a tire is somewhat flat or if a rim is bent, the wheel may exhibit wobble as it rolls.

Figure 7:
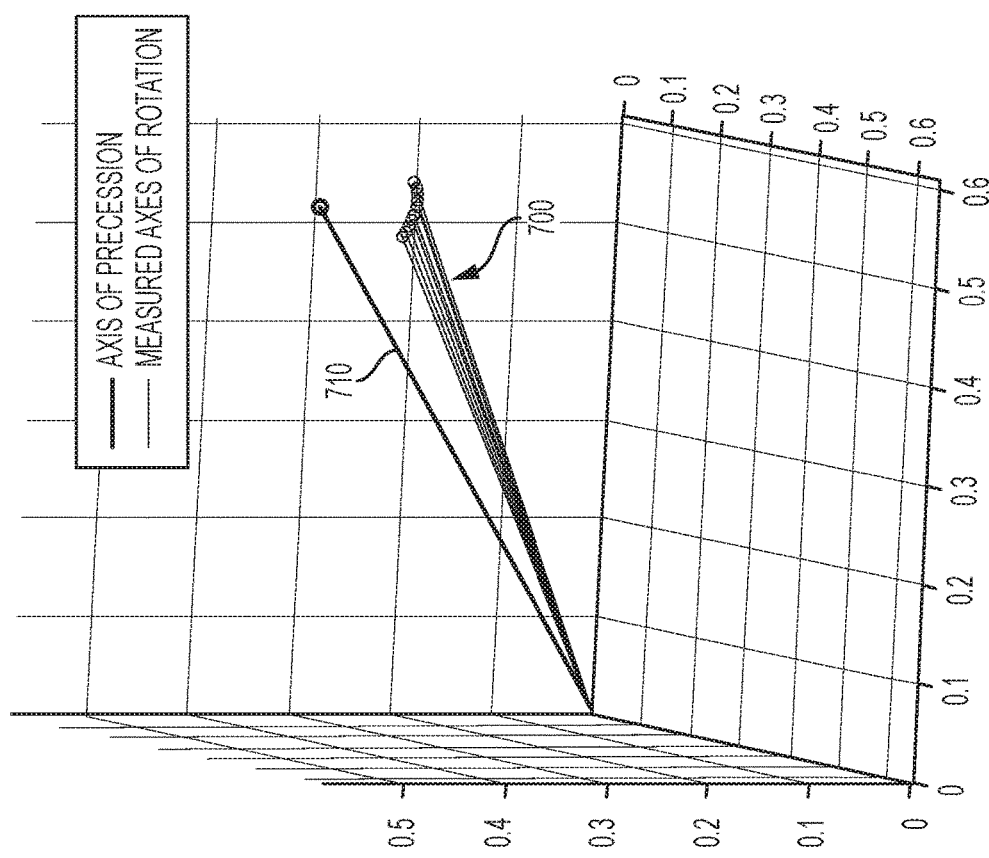
FIG. 7 is a graph depicting axes of rotation vs. axis of precession for a wheel having wobble.

When a wheel possesses a significant amount of wobble, the true wheel axis of rotation cannot be measured directly from changes in the orientation of the wheel mounted targets. Rather, the measured axes of rotation will precess about an axis. This "axis of precession" is the true wheel axis of rotation. This phenomena is illustrated in FIG. 7, which depicts measured wheel axes 700 for a wheel with a large amount of wobble (5 degrees). Ten measured wheel axes (dashed lines) 700 orbit about their axis of precession (dark solid line) 710 as the wheel rotates through an elapsed angle of rotation of 45 degrees. An embodiment for performing the wheel axis precession checks at steps 224-232 of FIG. 2 as part of the compensation procedure will now be illustrated in greater detail.

Figure 8:
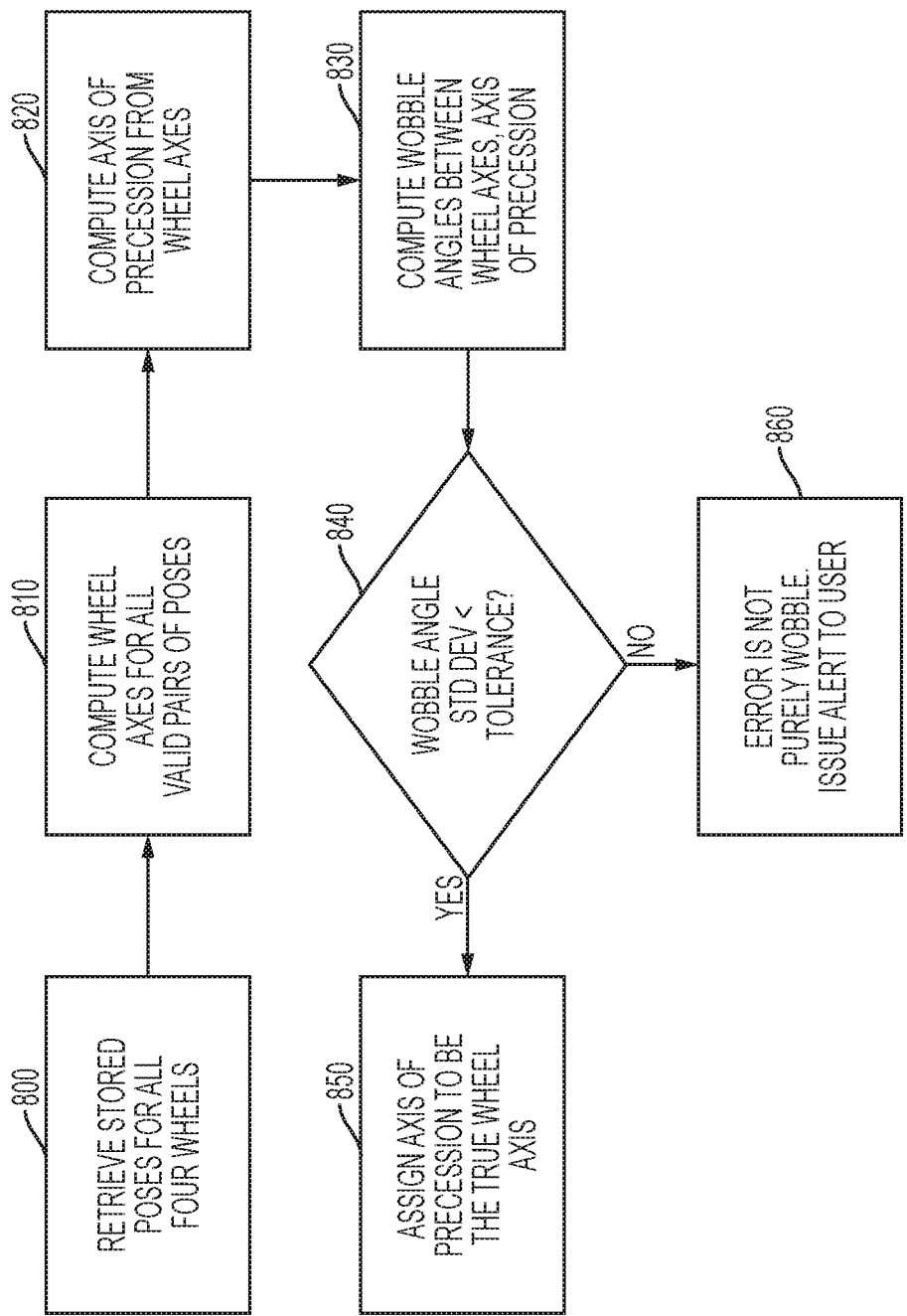
FIGS. 8 and 9 are flow charts illustrating a wheel wobble checking procedure according to an embodiment of the present disclosure.

The process for computing the axis of precession (i.e., the true wheel axis) from individual measured axes of rotation is depicted in the flow chart of FIG. 8. To compute the axis of precession, the tips of the wheel axes vectors are used as input to a best fit plane computation. Standard best fit plane algorithms are used to compute the best fit plane through the input wheel axes vector tips. The basic idea is to compute the true wheel axis (i.e. the axis of precession 710) from the measured wheel axes of rotation 700. The wheel wobble angle is then computed between the axis of precession 710 and each individual wheel axis of rotation 700.

Accordingly, as shown in FIG. 8, after retrieving the stored poses for the vehicle wheels at step 800, wheel axis precession is detected by calculating the wheel axis of rotation vectors of one of the vehicle wheels for each of the captured target poses of that wheel in a conventional manner (step 810), calculating an axis of precession based on the calculated wheel axes of rotation (step 820), calculating a wheel wobble angle between the axis of precession and each of the calculated wheel axes of rotation along with a standard deviation of the calculated wobble angles (step 830), and determining whether the standard deviation of the wobble angles is below a predetermined error threshold (step 840).

When the standard deviation of the wobble angles is below the error threshold, the wheel axis precession is compensated for by assigning the axis of precession to be the true wheel axis for a following alignment step (step 850). When the standard deviation of the wobble angles is above the error threshold, the user is alerted that the system cannot correct for the wheel axis precession (step 860).

Figure 9:
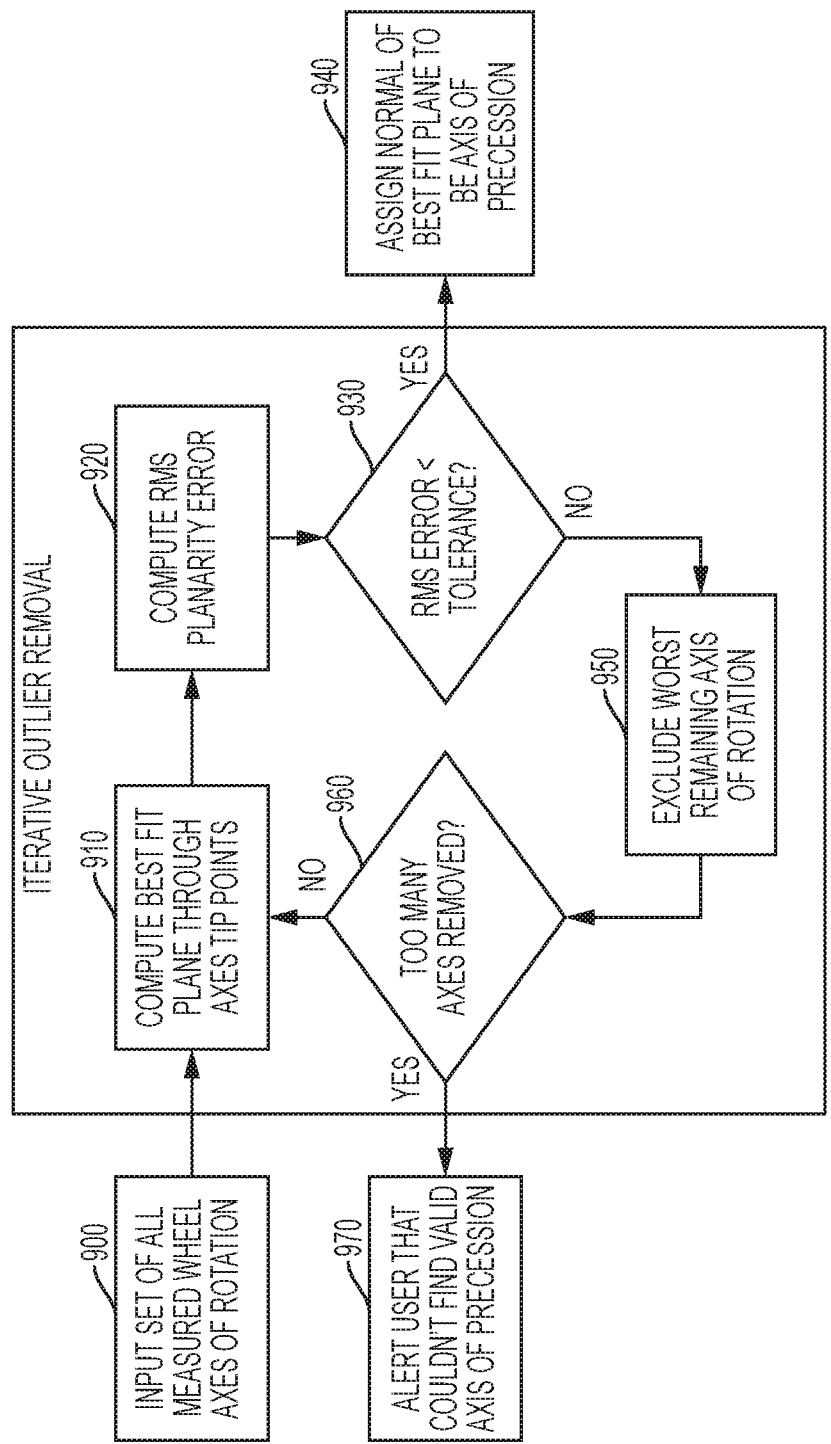

The algorithm in which axis of precession is computed is described in FIG. 9. The process for computing the true wheel axis of individual axes of rotation is iterative. Individual axes of rotation may be more erroneous than others and may thus degrade the accuracy of the best fit plane computation. For this reason, it is essential to remove individual wheel axes of rotation that are significantly more erroneous than the others.

Accordingly, computing the axis of precession comprises inputting the set of all measured wheel axes of rotation found in step 810 (step 900), and computing a best fit plane through the tips of the calculated wheel axis vectors (step 910). The root mean square (RMS) planarity error is then computed at step 920, and it is determined whether a deviation from the best fit plane is below a predetermined RMS error threshold at step 930.

When the deviation from the best fit plane is above the RMS error threshold, the wheel axis precession is computed by removing the wheel axis of rotation vector with the largest deviation from the best fit plane (step 950), recomputing the best fit plane (step 910), recomputing the RMS planarity error (step 920), determining whether the deviation is below the RMS error threshold (step 930), and repeating steps 950, 910, and 920 until the RMS deviation from the best fit plane is below the error threshold or until less than a predetermined minimum number of data points remain (this is checked at step 960). If less than the minimum number of axes remain, the user is alerted that the system cannot find a valid axis of precession, and therefore cannot correct for wheel axis precession (step 970). On the other hand, if the deviation is found to be below the RMS error threshold at step 960, and more than the minimum number of data points remain, the normal of the best fit plane is assigned to be the axis of precession at step 940.

One alternative way in which wheel axis of rotation precession could be detected is by stopping the vehicle at multiple points during the compensation roll and collecting data at each of these stopped positions. Axes of rotation could be computed for poses collected at each stopped position and the axis of precession could then be computed from these axes of rotation in an analogous manner to the previously-disclosed embodiment.

Camera Instability Detection

When rolling the vehicle during runout compensation, it is assumed that the measurement cameras are static. If the measurement cameras are bumped or otherwise moved during the data acquisition of FIG. 1, measurement errors will occur. It is thus crucial to detect for camera motion that occurs during the compensation data collection. It is straightforward to detect camera motion when it is known that wheel mounted targets are stationary. Detecting camera motion is more difficult when targets are not stationary in scenarios such as runout compensation. An embodiment for performing the camera instability checks at steps 234-242 of FIG. 2 as part of the compensation procedure will now be illustrated in greater detail.

In this disclosed embodiment, there are two forward facing cameras that are not rigidly connected; that is, their relative position and orientation can change. For example, such a camera arrangement is shown in FIG. 18 as cameras 16p, 16r attached to foldable arms 16n. A third "calibration" camera 16s is used to measure the relative orientation of the forward facing cameras 16p, 16r (see, e.g., U.S. Pat. No. 6,968,282). The calibration camera 16s is rigidly attached to a forward facing camera 16r. The calibration camera 16s views a calibration target 16q that is rigidly attached to forward facing camera 16p. In such a system, changes in the relative pose between the calibration target 16q and the calibration camera 16s constitute changes in the relative pose between the forward facing cameras 16p, 16r. Thus, motion of the camera system can be detected if the relative pose between the forward facing cameras changes.

Figure 10:
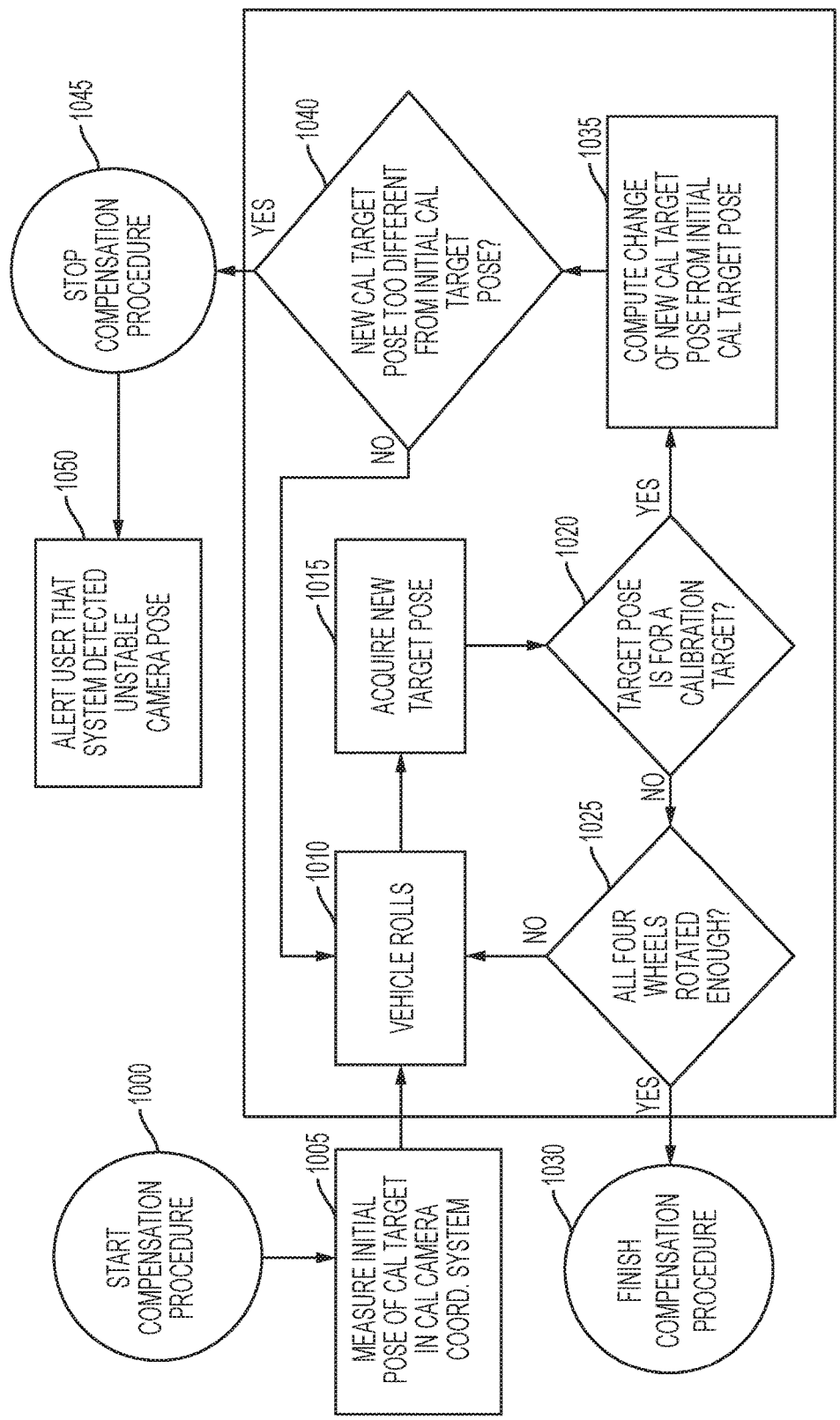
FIG. 10 is a flow chart illustrating a camera instability checking procedure according to an embodiment of the present disclosure.

An embodiment for performing the camera instability checks at steps 234-242 of FIG. 2 as part of the compensation procedure will now be illustrated in greater detail with reference to FIG. 10. It assumes the hardware configuration of the embodiment described above; i.e., a calibration camera measures the pose of a calibration target concurrently with forward facing cameras measuring wheel mounted target poses. As each new calibration target pose is received, it is compared to the initial calibration target pose that was acquired at the beginning of the compensation procedure. If the new measurement of target pose is significantly different from the stored initial calibration target pose, then the relative camera pose is unstable. In other words, either one or all forward facing cameras have been moved with respect to the others. As a result, the compensation procedure is stopped and the user is alerted that the assumption of stable cameras is not valid.

Accordingly, detecting instability of one or more of the forward facing cameras comprises starting the compensation procedure (step 1000) by measuring an initial calibration target pose in that camera's coordinate system (step 1005). As the vehicle rolls (step 1010), a new calibration target pose is acquired (step 1015). At steps 1020-1030, if the new target pose does not correspond to the calibration target (i.e., it corresponds to a wheel mounted target), the pose is used as input to the larger runout compensation process, and the amount of wheel rotation is checked to determine whether all four vehicle wheels have rotated an adequate amount to complete the compensation procedure.

At step 1035, the initial calibration target pose is compared with the succeeding one of the calibration target poses, to determine whether it deviates from the initial calibration target pose more than a threshold amount (step 1040). The compensation procedure is stopped (step 1045) and the user is alerted that the cameras are unstable when one of the succeeding calibration target poses deviates from the initial calibration target pose more than the threshold amount (step 1050). Otherwise, the process is repeated until the wheels have rotated an adequate amount.

Differences in the calibration target pose are computed for both rotation and translation. As a representative threshold, new calibration target poses must be within a translation of 0.15" and a rotation of 0.15° from the initial stored calibration target pose.

Through this process, data is acquired for performing runout compensation and for performing the various analytics checks described elsewhere. The camera instability process is run online during the compensation data acquisition process. If at any time the calibration target pose is measured to be too different from the reference target pose, the user is alerted that the camera instability is too large and the procedure is stopped.

There are various other ways in which detection of camera instability during compensation could be implemented. One could use additional sensors. For example, if there were accelerometers rigidly attached to each forward facing camera, one could monitor the accelerations to determine when camera pods change their pose. Additionally, camera instability detection can be implemented by securing a fixed reference target (or a series of such targets) to a rigid structure while still remaining in the field of view of forward facing cameras. For example, the targets could be secured to a wall or to a post on the floor. The pose of the reference targets could be measured throughout the compensation process. If the fixed reference target pose changes, as measured by any of the forward facing cameras, then it can be readily determined if the static camera assumption made during compensation is valid or not.

Detection of Suspension Changes During Alignment

The aligner measures the pose of the targets attached to the wheels and calculates the alignment of the vehicle after every pose measurement. When the user is making adjustments to the vehicle or performing procedures on the vehicle, he could make mistakes, do procedures incorrectly, or skip procedures all together, resulting in an inaccurate alignment. By taking fast measurements, the disclosed aligner can look for and detect when the operator makes one of these mistakes and inform him earlier, to prevent unwanted delay and give him quick feedback to help him learn and prevent future error repetitions.

A recognized source of measurement error when performing vehicle wheel alignments is stress changes induced in the vehicle suspension. If a vehicle suspension is stressed beyond typical rest conditions, the stress tends to gradually release as the vehicle is moved/adjusted during the course of an alignment procedure. This release of the suspension stress can significantly change wheel alignment angles. This gradual changing of wheel alignment angles can be particularly harmful in procedures like runout compensation. If a vehicle suspension de-stresses during runout compensation, the runout compensation could be significantly incorrect and as a result vehicle wheel alignment angles could be adjusted to incorrect values. This could in turn cause premature tire degradation and/or result in sub-optimal driving comfort.

There are several ways vehicle suspensions could become prematurely stressed in the course of performing alignment angle measurements. It is common for alignment technicians to raise vehicles up on alignment lifts to inspect the vehicle undercarriage prior to performing any measurements or adjustments. If the vehicle is lowered to the alignment lift surface and the slip plates are locked, the vehicle suspension can become stressed as the weight of the vehicle becomes supported by the suspension and the suspension is not free to adjust to its resting position. Another common way in which vehicle suspensions can become stressed is if the vehicle experiences a sharp turn immediately prior to driving onto the alignment lift. The sharp turn induces stress into the suspension and the very short straight line transit distance (essentially the length of the alignment lift) does not provide enough opportunity for the suspension to release.

Figure 11:
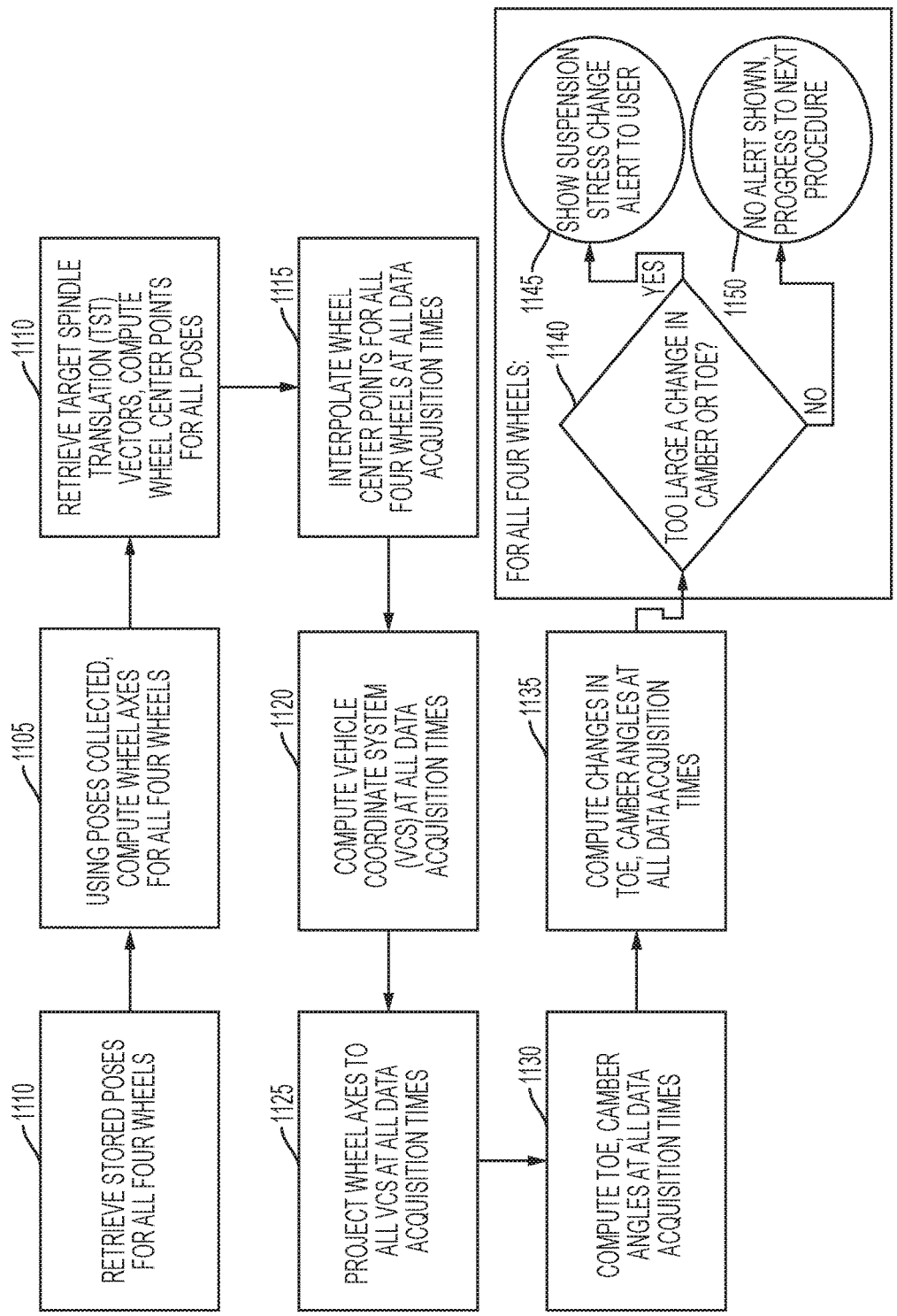
FIG. 11 is a flow chart illustrating a suspension stress checking procedure according to an embodiment of the present disclosure.

Whatever the cause, the gradual release of suspension stress during the course of an alignment is a problem that if not detected will negatively impact the alignment process. There are various ways in which the suspension stress change can be detected. One embodiment is depicted in FIG. 1 and FIG. 11. In this embodiment, the suspension stress check is performed as part of the runout compensation procedure. It can be part of the Compensation Analytics Engine of FIG. 2.

The data collection loop is depicted in FIG. 1. As discussed herein above, in this procedure, the vehicle is rolled through a rotation angle between start and stop positions. As the vehicle rolls between the start and stop positions, pose (position and orientation) measurements of the four wheel-mounted targets are acquired at semi-regular time or rotation intervals. The time stamps at which the saved pose data was acquired can also be collected. This is done in case image acquisition for all four wheels is not time-synchronized.

Once the data collection has finished for all four wheels (i.e., once each wheel has experienced enough elapsed rotation), a suspension stress detection algorithm can be run on the acquired target pose measurements. The computations and decision logic for checking if this suspension change occurred is depicted in FIG. 11. The basic idea of the algorithm is to compute toe and camber angles through the full range of data that was collected in the process of FIG. 1. Then, for all the toe and camber angles at all time or rotation steps, checks are performed looking for large deviations in these alignment angles. Toe and camber angles shouldn't change as a vehicle is rolled back and forward, and this invariance is used to perform in-situ checks of alignment angle consistency. If alignment angles show a significant change during the rollback (e.g., about 0.1 degrees of camber/toe change) then this indicates the suspension of the vehicle is releasing stress during the vehicle roll. To summarize, in this embodiment detecting stress in the suspension of the vehicle comprises computing at least one wheel alignment parameter for each of the vehicle wheels for each of the captured target poses of that wheel, calculating changes in the wheel alignment parameter for successive captured target poses, and determining whether the changes are below a predetermined change threshold.

As shown in FIG. 11, the stored poses for the vehicle wheels are retrieved at step 1100, and are used to compute the wheel axes in a conventional manner (step 1105). The TST vectors are then retrieved at step 1110, and the wheel center points for all poses are computed. At steps 1115 to 1130, toe and camber angles are derived at all data acquisition times by well-known techniques, and at step 1135 changes in the toe and camber angles are computed at all data acquisition times. Then, at step 1140, the camber and toe changes for each wheel are compared to a threshold value as discussed herein above, and if the stress change is larger than the threshold, the user is alerted at step 1145. If the stress change is less than the threshold, the system proceeds to the next alignment procedure at step 1150.

In FIG. 11, reference is made to TST (Target Spindle Translation) at step 1110. As discussed herein above, this is a calibration that quantifies the translation ray from the center of the reference target to the center of the wheel rim. It is used to find the location of wheel rim centers. These wheel rim centers are then used to compute the VCS (Vehicle Coordinate System), which is the frame of reference for wheel alignment angles in the preferred embodiment.

Pose measurements for each wheel might not be acquired in a time synchronized manner. For such a scenario, when computing the VCS from the wheel rim center points it is essential to interpolate the wheel center points to all pose measurement times. These interpolated wheel center points are then used to compute the VCS at all measurement times. See steps 1115 and 1120.

A key consideration of this disclosure is that the suspension stress check is performed "behind the scenes," such that the end user isn't burdened with additional tasks or with unnecessary information. The user is only given instructions/notifications in the event suspension stress is detected during the normal course of events performed as part of an alignment process. This decision logic is depicted in the lower right-hand rectangle inside of FIG. 11.

A key enabling technology for this steady state monitoring is a very fast measurement process. In FIG. 11, the core measurement of interest is the pose (position and orientation) of a target that is rigidly mounted to a vehicle wheel. Performing a fast measurement process thus equates to performing measurements of target pose very rapidly. In imaging aligners, computing pose rapidly involves performing optimized image processing and applying optimized iterative algorithms to estimate the position and orientation of the reference targets, as discussed herein above.

The high speed measurement process provides for many updates and multiple checks (approximately 20 poses collected per wheel during a fast vehicle roll) to be performed during the course of measurement processes which may only take several seconds. The very fast measurement process allows the steady state suspension stress monitoring to be run in the background, not providing any updates to the user unless a problem is detected. This provides for a very user-friendly method to identify measurement problems.

Once a change is discovered, it would be helpful if instead of a warning, the aligner compensated for the change and continued on with the alignment with the corrected readings. To do this, in certain embodiments the measurement change of specific alignment readings of the vehicle is plotted on a graph or table or a formula for a given procedure. Using these empirically derived reference plots/table/formula, the aligner matches where the current vehicle under test is in the settling process and predicts where it will be once completely settled. Thus, instead of alerting the user to a suspension stress change in step 1145, the system could compare the change to an empirical reference value or use the change in an empirical formula to predict a value for the alignment parameter when the suspension is settled, and use the predicted value in the subsequent alignment step. As an example, if a vehicle is under stress at the beginning of the roll back procedure, one way to remove the stresses is to roll it backwards and forwards 3 or 4 times. From empirical testing it is noted that after the first roll back only 50% of the stress is relieved. Therefore, when the current vehicle under test has a change of say 0.1 degree after the first roll, it is predicted that if it were rolled backward and forward 3 more times to its fully settled state, it would change 0.2 degree. This full settlement value could be used to display what that actual reading would be if the vehicle were fully settled.

There are various alternative techniques in which suspension stress changes can be identified. The above-described embodiment of FIGS. 1 and 11 uses changes in camber and toe angles as the metric for identifying suspension stress changes. However, it is possible, for example, to instead compute and monitor the wheel axes of rotation during the course of the runout compensation procedure. For a pure translation of the vehicle chassis (as is experienced during runout compensation), the wheel axes should not change direction. If they do gradually change direction, this is an indication of suspension stress release.

In the embodiment of FIGS. 1 and 11, the suspension stress check is performed at multiple steps throughout the compensation roll without stopping. It is, however, possible to pause at multiple steps during the compensation roll process and compute the various suspension stress quantities at each step. This requires more cooperation from the end user and is thus less user friendly, but such a series of stops would provide the same suspension stress checks as in the preferred embodiment.

Repeated reference is made to a Vehicle Coordinate System in FIG. 11. The disclosed technique does not however require a VCS. Any frame of reference suitable for expressing wheel alignment angles could be used in lieu of the VCS as defined above. The core principle of the disclosure is to search for changes in alignment angles, however such may be computed. Likewise, reference is made in FIG. 11 to TST calibrations which are used to compute Vehicle Coordinate Systems. The use of TST calibrations to compute such Vehicle Coordinate Systems is likewise not the only possible way to implement this feature of the disclosed aligner.

The disclosed suspension stress change monitoring is performed during the runout compensation process. This is done out of convenience as the user performs this process regardless of whether or not suspension stress is monitored. However, the disclosed suspension stress check does not have to be performed as part of the compensation procedure. It could be performed as a stand-alone procedure (for example, for alignment systems that do not require runout compensation) or it could be performed in any other alignment procedure where the suspension stress metrics should remain invariant.

Thrust Angle Checking Procedures

The vehicle thrust direction is the direction along which vehicle moves. In passenger vehicles, thrust is defined by the relative toe angles of the rear wheels. Thus, when performing measurements on the front wheels the thrust direction shouldn't change. By continuously monitoring the vehicle thrust angle during the course of various front wheel measurements, the disclosed aligner can detect problems in the alignment lift without tasking the end user with any additional measurement steps. This functionality is enabled by the aligner's very fast measurement process, which calculates multiple target poses for the vehicle wheels as they move.

Figure 12:
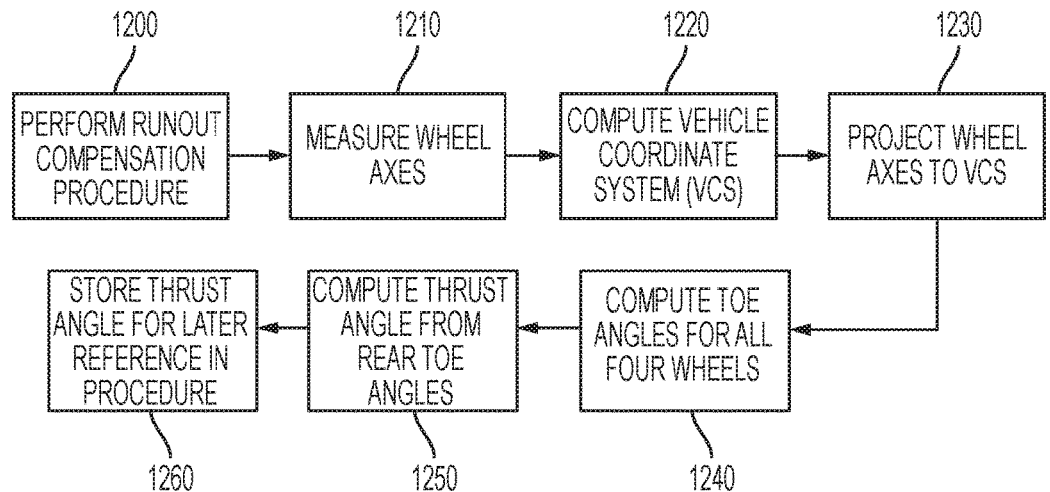
FIGS. 12 and 13 are flow charts illustrating a thrust angle checking procedure according to an embodiment of the present disclosure.

FIG. 12 depicts the process in which a thrust angle is computed initially for a particular measurement procedure (runout compensation). The basic idea is that thrust angle is measured at the start of a measurement process in a conventional manner. To compute thrust angle in an invariant Vehicle Coordinate System (VCS), one must first compute the toe angle in that same VCS. To compute toe angle in this invariant coordinate system, one must perform runout compensation (step 1200) and determine and store the wheel axes for each individual wheel (step 1210). The next steps are to compute the VCS from individual measurements of pose for the wheel mounted targets (step 1220) and project the wheel axes to the VCS (step 1230). The toe angles are then computed for all four wheels (step 1240), and the thrust angle is computed from the rear toe angles (step 1250). This initial thrust angle is stored as a reference angle at step 1260.

Equation 2 shows the well-known formula for computing thrust angle in step 1250. Essentially, thrust angle is the average difference between the right rear and left rear toe angles.

$$\text{thrust} = \text{Right Rear Toe Angle} - \text{Left Rear Toe Angle}/2 \quad \text{Equation 2: Computation of Thrust Angle}$$

Figure 13:
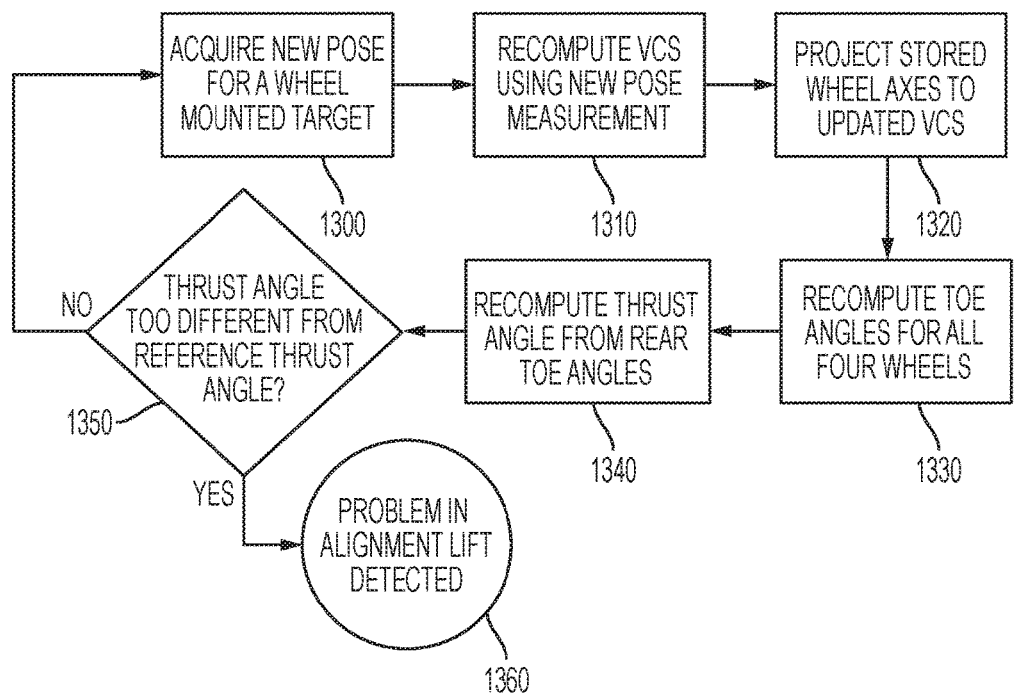

FIG. 13 illustrates the steady-state thrust angle monitoring process of this embodiment. When a new pose for a wheel target is acquired at step 1300, as during the compensation procedure of FIG. 1, the VCS is recomputed using the new pose measurement (step 1310), the wheel axes computed at step 1210 are projected to the updated VCS (step 1320). Toe angles are recomputed at step 1330, and the thrust angle is recomputed at step 1340. The recomputed thrust angle is compared to the initial reference thrust angle in step 1350, if it deviates more than a predetermined threshold amount, the user is alerted to a problem at step 1360. In certain embodiments, the thrust angle check of FIG. 13 is performed as part of the runout compensation procedure. It can be part of the Compensation Analytics Engine of FIG. 2.

The steady state monitoring process of FIG. 13 runs when performing various measurements where the vehicle moves but where thrust angle should remain invariant despite the vehicle motion, such as during caster measurement, runout compensation, and when performing adjustments to front wheel alignment angles.

Where and how might this steady state monitoring of thrust angle be useful? For example, when performing caster swing the front wheels are turned left to right or right to left. During this process, the slip plates on the alignment lift are unlocked and the vehicle is free to translate along the two dimensional surface of the alignment lift. If for example the left rear slip plate is not free to move but the plates for the other three wheels are free to translate, there will be stress induced in the left rear wheel. This stress can manifest itself by twisting the wheel so as to change the toe angle on the left rear wheel without significantly changing right rear toe angle. As per Equation 2 above, such a series of events will result in a change in the thrust angle. In such a scenario the rapid steady state updates of thrust angle of the disclosed aligner (e.g. 20 updates per second) can be used to alert the user that a problem has been detected which could result in a deficient alignment for the vehicle under consideration.

A key enabling technology for this steady state monitoring is a very fast measurement process. In FIG. 13, the core measurement of interest is the pose (position and orientation) of a target that is rigidly mounted to a vehicle wheel. Performing a fast measurement process thus equates to performing measurements of target pose very rapidly. In imaging aligners, computing pose rapidly involves performing optimized image processing and applying optimized iterative algorithms to estimate the position and orientation of the reference targets.

The high speed measurement process provides for many updates (e.g., approximately 20 poses collected per wheel during a fast vehicle roll) and checks to be performed during the course of measurement processes which may only take several seconds. The very fast measurement process allows the steady state thrust angle monitoring to be run in the background, not providing any updates to the user unless a problem is detected. This provides for a very user-friendly method to identify deficiencies in support equipment.

In the embodiment of FIGS. 12-13 above, thrust angle is computed at finely spaced time intervals during the course of a measurement process. Thrust angle is the preferred reference quantity because it is a property of the vehicle that is invariant to many changes in the vehicle, and because it can be used as a check in multiple common alignment measurement processes. There are, however, alternative metrics one could use in a manner similar to thrust angle. For example, one could use individual rear toe angles, individual rear camber angles, total rear camber angles, and other measurements that are invariant to many common vehicle motions.

In the embodiment of FIGS. 12-13, a Vehicle Coordinate System is used as the invariant coordinate system in which the reference measurement is computed. Alternative invariant coordinate systems to a VCS could however be used to similar effect. For example, a stationary reference target coordinate system off the vehicle lift could be used as the basis of all measurements.

In addition, it is not required to perform the aforementioned thrust angle checks at very frequent time intervals. A slower measurement procedure wherein the end user must repeatedly pause the system so that thrust angle (or other invariant metric) can be recomputed and checked against the reference steady state value could be performed to similar effect as the above-described embodiment. It has the disadvantage of requiring more time and more effort of the end user.

Non-Static Runout Compensation

The disclosed aligner allows a technician to perform a runout procedure quickly by pushing and/or pulling the vehicle so its wheels roll through an angle of rotation continuously without pausing at turnaround points. This functionality is enabled by the aligner's very fast measurement process, which calculates multiple target poses for the vehicle wheels as the vehicle is rolled (e.g., at least one pose for every five degrees of rotation).

A faster, more user-friendly measurement of runout compensation is provided via a procedure hereinafter referred to as "rapid runout." In rapid runout, the user pushes the vehicle to roll through an angle of rotation. As the vehicle starts rolling, measurements are collected and logged for post-processing until the elapsed angle of rotation is experienced. Each "measurement" consists of the pose (position and orientation) of a target that is rigidly attached to one of the four vehicle wheels. Throughout the roll, measurements are acquired steadily for all vehicle wheels at semi-regular intervals.

If measurements show a significant rotation from the previous stored measurements for their associated wheel then they get stored for post-processing. The non-static compensation data acquisition process is depicted in FIG. 1, and is the same in all relevant respects as the procedure described herein above.

The data acquisition process loops until sufficient elapsed rotation (e.g., 35 degrees) has been measured for all vehicle wheels. The salient point is that data is collected as the vehicle rolls without requiring any pauses or decisions from the end user. Data collection stops automatically as well. The process is seamless.

The pose measurements that are collected and monitored consist of translation and orientation components of the observation targets in a reference coordinate system. Pose is computed from image acquisitions of the reference targets on individual wheels.

Data collection is not required to start and stop in a time-synchronized manner for all four wheels. Once a given wheel has been measured to exhibit sufficient rotation, data collection for that wheel stops. Data collection continues for other wheels until they have been measured to experience enough elapsed rotation. Once sufficient rotation has been measured for all wheels, the collected target pose data is passed to a non-static compensation algorithm. The end result of the algorithm is the wheel axis for each vehicle wheel.

Figure 14:
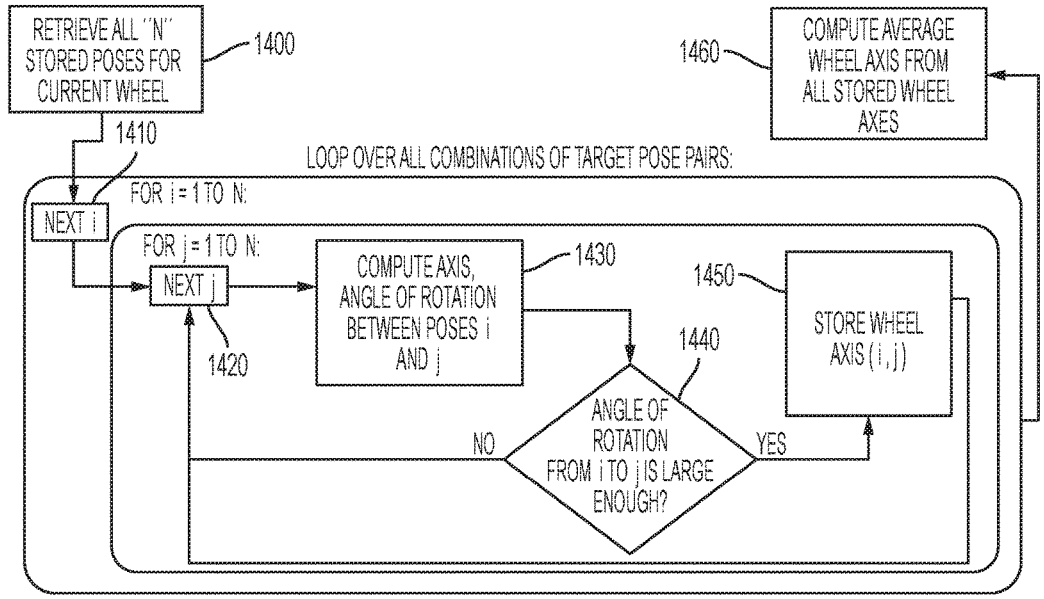
FIG. 14 is a flow chart illustrating a non-static runout compensation procedure according to an embodiment of the present disclosure.

This process is depicted in FIG. 14. At step 1400, all stored poses for a rotated wheel are retrieved. For all combinations of target pose pairs, (steps 1410, 1420), the wheel axis and angle of rotation between them is computed (step 1430). If the angle of rotation between them is larger than a predetermined threshold amount at step 1440, the wheel axis is stored at step 1450. When all combinations of target pose pairs have been iterated, the average wheel axis of all the stored wheel axes is computed at step 1460.

The wheel axis is used later in the wheel alignment process to compute toe and camber alignment angles. It is thus of paramount importance to measure this quantity as accurately as possible. The basic principle in computing the wheel axis, as shown in FIG. 14, is to loop over all combinations of poses (compared two at a time) and between each pair of poses compute the axis of rotation and angle of rotation about that axis. If the elapsed angle of rotation is sufficiently large (e.g., 15 degrees) then store that wheel axis and use it later to compute the mean wheel axis. If the angle of rotation between a pair of poses isn't large enough then the accuracy of the wheel axis direction will suffer and that axis of rotation shouldn't be used later to compute the mean wheel axis.

The axis of rotation can be computed at step 1430 using a number of standard well-known techniques. In one embodiment, the 3×3 rotation matrix that rotates the target coordinate axes from one pose measurement to the next is computed. Then, an eigenvector/eigenvalues decomposition is performed on this 3×3 rotation matrix. The eigenvector corresponding to the principal eigenvalue is then assigned to be the axis about which the target rotates, i.e. the axis of rotation.

A key enabling technology for this steady state monitoring is a very fast measurement process, as described herein above. The high speed measurement process provides for many updates and checks to be performed during the course of a vehicle roll which typically only takes several seconds. The very fast measurement process allows for data redundancy which can enable a more accurate measurement of runout compensation. Most importantly, the user does not need to pause and wait while target poses are being acquired.

There are alternative embodiments by which non-static compensation could be achieved. The specific rolling procedure in which data collection occurs is not material to the present disclosure. For example, in some applications it is preferable to roll the vehicle to the back of the alignment lift and then return it to the front without pausing. In others (for example, in so-called "audit" configurations) it may be preferable to perform one roll without a corresponding return to the initial position. In other scenarios it may be preferable to perform several consecutive shorter rolls. In all scenarios the data acquisition process of FIG. 1 and the wheel axis computation algorithm of FIG. 14 can be carried out for every rolling motion.

In the embodiment of FIGS. 1 and 14, the entire car rolls and all four wheels rotate in tandem (though not necessarily by the same angle). In other embodiments, all 4 wheels do not rotate concurrently. For example, the non-static compensation procedure as described above could be carried out while a vehicle is elevated and wheels are rotated in isolation without any corresponding translational motion of the vehicle chassis. In another embodiment, so-called "two wheel runout" can be performed where only two of the wheels (typically the front wheels) have runout compensation performed on them. The same data collection and data processing algorithms are used in these special cases.

In the embodiment of FIGS. 1 and 14, repeated reference is made to poses (positions and orientations) of reference targets that are rigidly attached to wheels. However, the use of fixed reference targets that are rigidly attached to wheels is not strictly required. One could measure the position of a cluster of 3D points rigidly attached to a wheel during the compensation roll. The rigid body transformation of this cluster of points could then be used to compute the wheel axis of rotation at discrete measurement times during the compensation roll. These 3D points that are tracked during the compensation roll could be textured feature points present on the wheel, or they could be reference fiducial points attached to the wheel rim as part of the compensation measurement process.

The end result of the disclosed non-static runout compensation process for each wheel is a single averaged wheel axis vector. However, the computation of a mean wheel axis is not strictly required. For example, one could perform additional statistical analysis to select the most typical "median" wheel axis vector. Additional methods could be used to find the resultant wheel axis vector from the set of stored wheel axes. The disclosure does not depend on a statistical combination of individual wheel axes (mean, median, or other). One could simply take the wheel axis to be the axis of rotation from the largest observed angle of rotation in the set of stored poses for that wheel. The key is that wheel axes are computed without requiring the user to pause and hold at any point during the data acquisition process.

Non-Static Caster Swing

The disclosed aligner allows a technician to perform a caster swing quickly by turning the vehicle wheels continuously without pausing at turnaround points. This functionality is enabled by the aligner's very fast measurement process, which calculates multiple target poses for the vehicle wheels as they are turned.

A principle quantity of interest in vehicle wheel alignment is caster angle. Caster is defined as the back/forward inclination angle of the steering axes for the front vehicle wheels. To measure this inclination angle of the steering axis it is necessary to make the vehicle front wheels exhibit a rotation about their steering axes. In other words, one must turn the front wheels left and right an appreciable amount to enable an accurate measurement of the steering axes. In typical wheel alignment systems, this process of turning left and right requires a pause at each of the various turnaround points. This pause adds unnecessary delay to the caster angle measurement process.

Figure 15:
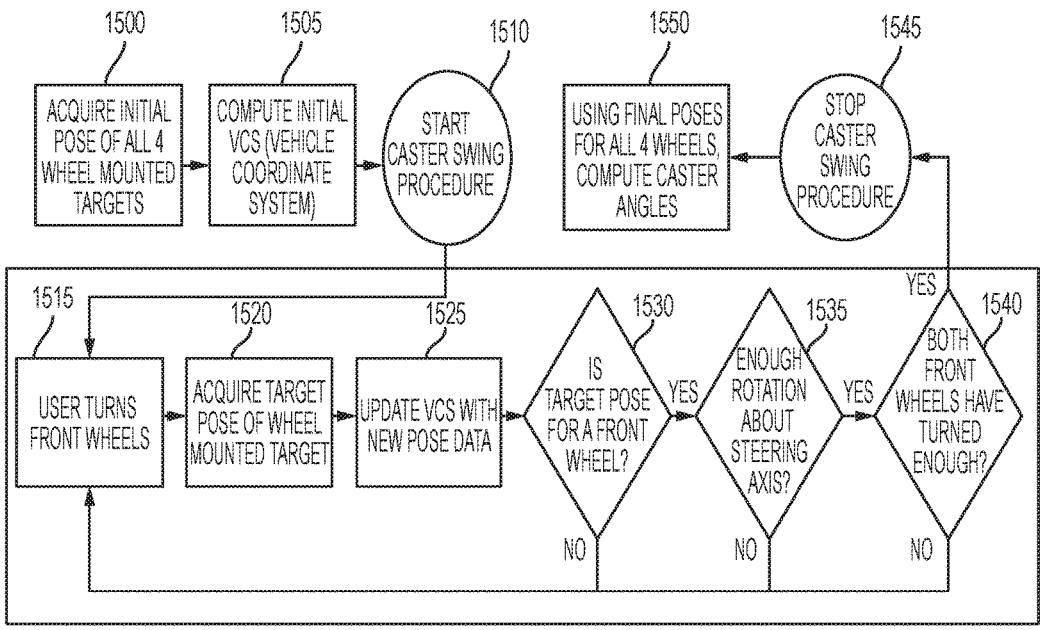
FIG. 15 is a flow chart illustrating a non-static caster swing procedure according to an embodiment of the present disclosure.

This unnecessary pause is eliminated in a process hereinafter called "non-static caster". This measurement process is depicted in FIG. 15. At step 1500, the initial poses of all four wheel-mounted targets are acquired (i.e., while the wheels are not being turned), and the initial VCS is computed in a conventional manner (step 1505). The caster swing procedure starts at step 1510 as the user turns the steerable wheels of the vehicle, typically the front wheels, capturing image data of the target as the wheel and target are continuously turned to the left and to the right of center without a pause (step 1515). The captured image data comprises a minimum number of poses of the target; e.g., at least one pose for every 5 degrees of turning of the wheels. As each target pose is acquired (step 1520), the VCS is updated (i.e., recomputed) with the new pose data at step 1525. The system notes whether the target pose is for a front wheel at step 1530, and if so whether there is enough rotation about the steering axis from the previous front wheel pose (step 1535), and if so whether the wheels have been turned less than a predetermined number of degrees (step 1540). If the answer to any of these questions is "no," the process iterates. When both front wheels have turned an adequate number of degrees, the caster swing procedure is stopped at step 154, and the caster angles are computed using the final stored poses for all four wheels (step 1550) in a conventional manner.

A key enabling technology for this steady state monitoring is a very fast measurement process, as described herein above, which equates to performing measurements of target pose very rapidly. The high speed measurement process provides for many updates and checks to be performed during the course of a wheel turning process which may only take several seconds.

To compensate for the camera and processing not being fast enough, in certain alternative embodiments the aligner collects and stores images and only process every Nth image (for example, every 10th image). This technique results in an effect similar to a non-static caster measurement, in that the aligner can instruct the user to stop turning the wheel as soon as it measures enough rotation about the steering axis without a pause, and then instruct him to turn the wheel back, all the while saving the images of this "burst mode" for future processing. In the background, when bandwidth is available the saved images are processed; however, there would be a delay after the caster swing is complete for all the images to be processed and the caster measured and ultimately displayed to the technician. Burst mode has certain disadvantages because (1) the user does not know as quickly when sufficient rotation has occurred; (2) the LED strobe isn't being updated as regularly as when using "fast" processors so the strobe might be too dim or too bright, producing reduced quality measurements; (3) a significant amount of fast data storage is required; and (4) there is a pause after the swing is complete for the measured values to be displayed.

Alternative Embodiments

In the embodiment of FIGS. 1-15, repeated reference is made to poses (positions and orientations) of reference targets that are rigidly attached to wheels. The disclosed techniques do not strictly require the use of fixed reference targets that are rigidly attached to wheels. One could measure the position of a cluster of 3D points rigidly attached to a wheel during the compensation roll. The rigid body transformation of this cluster of points could then be used to compute the wheel axis of rotation at discrete measurement times during the compensation roll. These 3D points that are tracked during the compensation roll could be textured feature points present on the wheel, or they could be reference fiducial points attached to the wheel rim as part of the compensation measurement process.

All of the above checks in the compensation analytics engine can be performed in real-time, as the compensation rolling motion of the vehicle is performed. It is not required to gather a complete set of target poses along the full range of the compensation roll to perform the various integrity checks.

Fully Networked Aligner

When an aligner is in need of repair, a service technician is sent to the site to work on the aligner. Sometimes the issue could be resolved without a costly service call if the service technician could operate the aligner remotely. Methods exist for taking control of an aligner remotely using special software and an internet connection, but they are limited in their capabilities. See, e.g., U.S. Pat. Nos. 8,073,586 and 8,452,484, which are hereby incorporated by reference in their entirety herein.

There is a need for a remote display/interface for the technician on site using the equipment, and a remote display/interface that service personnel at a different location can use to control the aligner, all on a simple readily available device. A solution that easily does both of these in one simple architecture will now be disclosed. In this embodiment, a wireless network is employed to physically disconnect the constituent hardware components of the aligner to each other and to the internet. This enables a wireless device such as a laptop, tablet, mobile phone, or any other device with a web browser to connect to the aligner to provide a remote display/interface for the aligner.

Figure 26:
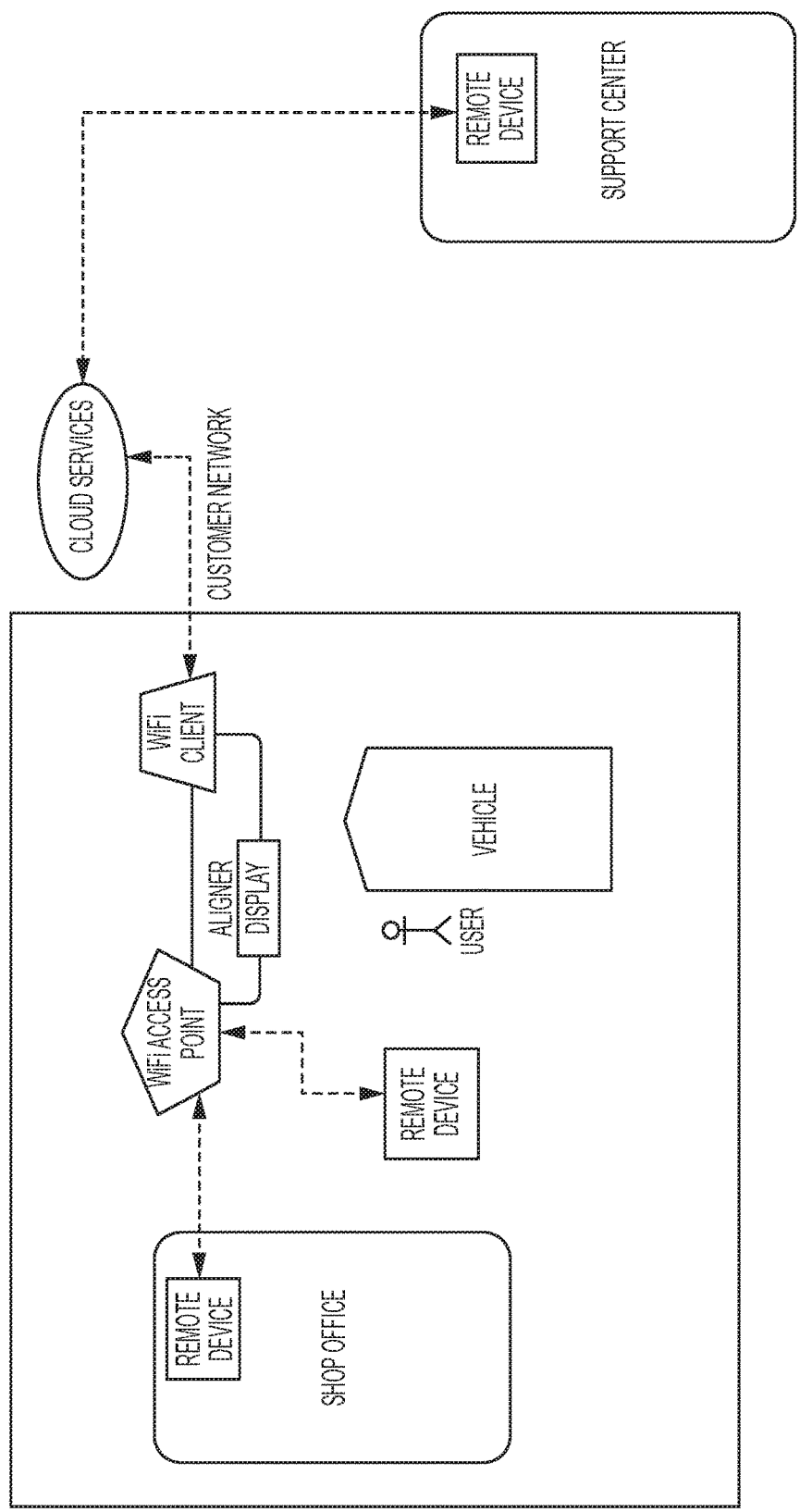
FIG. 26 is a block diagram of a networked wheel aligner according to an embodiment of the present disclosure.

As shown in FIG. 26, the disclosed aligner can be wirelessly connected to two networks: a first network connecting the aligner parts (e.g., the two camera housings and the display and a remote device) and the shop network (e.g., the internet), and the two networks communicate with each other.

In certain embodiments, a wireless network is employed to physically disconnect the constituent hardware components of the aligner. It is desirable that the main processing component of the system which computes the measurement angles remains fixed in front of the vehicle for the duration of the alignment procedure. This component establishes a secure wireless access point that can be accessed by any number of wireless devices. An application server runs software services that support client connections via any standards-compliant web browser. The user can connect to the wireless access point and interact with the browser with a laptop, tablet, mobile phone, or any other device with a web browser. It becomes unnecessary for the technician to physically interact with the fixed measuring device during an alignment procedure. The technician is able to perform all the necessary steps to complete the vehicle alignment in the process of physically adjusting the suspension. This provides both a time and cost savings over current solutions.

Additionally, the disclosed networked aligner can establish a client connection to an external WiFi access point, to provide internet access to the software components running in the system. This is advantageous for software/firmware version management, maintenance, and trouble shooting. Providing the ability to access the equipment over the internet translates directly to more up-time. It becomes unnecessary for a service technician to visit the aligner in person to diagnose issues or to install software updates. This saves the owner time because the machine is typically down waiting for the service technician, which could take hours or days.

CONCLUSION

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A portable vehicle alignment system, comprising:
   a base;
   a substantially vertical central column rigidly attached to and supported by the base, the central column having a carriage mounted to move along a length of the central column; and
   a pair of camera arm assemblies, each camera arm assembly having a proximal end pivotably attached to the movable carriage, and a distal end comprising a camera pod;
   wherein a first one of the camera pods comprises a first camera for capturing image data of a first target mounted on a vehicle, and a calibration target disposed in a known relationship to the first camera;
   wherein a second one of the camera pods comprises a second camera for capturing image data of a second target mounted on the vehicle, and a calibration camera disposed in a known relationship to the second camera for capturing images of the calibration target; and
   wherein the camera arm assemblies are pivotable between an extended position where the first and second cameras are respectively disposed to capture image data of the first and second targets mounted on the vehicle, the calibration camera is disposed to capture images of the calibration target, and the aligner has a first width between the two camera pods, and a folded position where the aligner has a second width smaller than the first width between the camera pods.

2. The system of claim 1, wherein in the folded position, the carriage is disposed proximal the base.

3. The system of claim 2, wherein in the folded position, the camera pods are disposed proximal to the column.

4. The system of claim 1, comprising a wireless communication hub, wherein at least one of the first and second camera pods comprises a wireless communication device for communicating with the wireless communication hub.

5. The system of claim 1, wherein the base has at least one wheel engageable with a floor surface for moving the base column assembly.

6. The system of claim 1, wherein the base has a shelf for supporting a keyboard.

7. The system of claim 6, wherein the keyboard shelf is further configured to support a printer.

8. The system of claim 1, wherein the central column has a bracket for supporting a monitor.

9. The system of claim 1, wherein the central column has a bracket for supporting a keyboard.

10. The system of claim 1, wherein the base comprises at least one clamp hanger structure for supporting a clamp hanger bracket for removably holding a vehicle wheel clamp and target assembly.

11. The system of claim 4, comprising a mobile console for supporting at least one of a display device, a printer, and a user input device for communicating with the wireless communication hub.

12. The system of claim 4, wherein the wireless communication hub is for connecting to and communicating with an external network.

13. The system of claim 11, wherein the mobile console is engageable with the base, and has a power source to supply power to the at least one of a display device, a printer, and a user input device.

14. The system of claim 13, wherein one of the mobile console and the base has a magnet for removably engaging the mobile console and the base.

15. The system of claim 1, comprising a display device and an adjustable mount for movably mounting the display device such that a height of the display device is adjustable between a first height and a second height proximal to a floor surface, whereby the display device is visible to a user of the system from underneath the vehicle.

16. The system of claim 15, wherein the adjustable mount comprises one or more pivoting arms.

17. The system of claim 15, wherein the adjustable mount comprises a rail for slidably mounting the display device for motion between the first and second heights.

* * * * *